United States Patent
Kong

(10) Patent No.: US 11,800,192 B2
(45) Date of Patent: Oct. 24, 2023

(54) BULLET SCREEN PROCESSING METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Guangdong (CN)

(72) Inventor: Fanyang Kong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/692,318

(22) Filed: Mar. 11, 2022

(65) Prior Publication Data

US 2022/0201364 A1    Jun. 23, 2022

Related U.S. Application Data

(63) Continuation of application No. PCT/CN2020/126142, filed on Nov. 3, 2020.

(30) Foreign Application Priority Data

Feb. 10, 2020    (CN) .......................... 202010085287.8

(51) Int. Cl.
*H04N 21/472*    (2011.01)
*H04N 21/485*    (2011.01)
*H04N 21/488*    (2011.01)

(52) U.S. Cl.
CPC ... *H04N 21/47205* (2013.01); *H04N 21/4854* (2013.01); *H04N 21/4884* (2013.01)

(58) Field of Classification Search
CPC ......... H04N 21/47205; H04N 21/4854; H04N 21/4884; H04N 21/4312; H04N 21/47217; H04N 21/475
See application file for complete search history.

(56) References Cited

U.S. PATENT DOCUMENTS 11,599,862 B1 *    3/2023  Hecht ................... G06F 3/0481
2014/0013200 A1    1/2014  White

FOREIGN PATENT DOCUMENTS

| CN | 104935997 A | 9/2015 |
| CN | 104967876 A | 10/2015 |

(Continued)

OTHER PUBLICATIONS

M. Gunnell, "How to Change the Default Font in Powerpoint," How to Geek website, published Jun. 6, 2019, downloaded from https://www.howtogeek.com/415744/how-to-change-the-default-font-in-powerpoint/ (Year: 2019).*

(Continued)

*Primary Examiner* — Eric J Yoon
(74) *Attorney, Agent, or Firm* — Sughrue Mion, PLLC

(57) ABSTRACT

This application provides a bullet screen processing method and apparatus, an electronic device, and a computer-readable storage medium. The method includes: displaying a bullet screen editing interface when a bullet screen editing operation is received during the playback of multimedia information; receiving the bullet screen content and bullet screen style set for the bullet screen content using the bullet screen editing interface; and transmitting the bullet screen content and the bullet screen style so that the bullet screen content conforming to the bullet screen style set can be displayed in a multimedia interface.

19 Claims, 9 Drawing Sheets

(56) References Cited

FOREIGN PATENT DOCUMENTS

| CN | 106101804 | * | 11/2016 | ........... H04N 21/235 |
| CN | 106101804 | A | 11/2016 | |
| CN | 107040824 | A | 8/2017 | |
| CN | 107734373 | * | 2/2018 | ........... H04N 21/422 |
| CN | 107948760 | A | 4/2018 | |
| CN | 108401175 | A | 8/2018 | |
| CN | 109324728 | A | 2/2019 | |
| CN | 111294663 | A | 6/2020 | |

OTHER PUBLICATIONS

YouTube video by username PDFEditing, "How to Create Fly in Animation in Microsoft Powerpoint 2017," published Jul. 29, 2017, downloaded at https://www.youtube.com/watch?v=dcMarC_iYio (Year: 2017).*

YouTube video by username Pond5, "3 Ways to Animate Text in Adobe After Effects," published Nov. 5, 2018, downloaded from https://www.youtube.com/watch?v=ax6DTRn1m6g (Year: 2018).*

Superuser discussion forum, "Move a selection to specific X, Y position in Photoshop," published Oct. 12, 2011, downloaded from https://superuser.com/questions/345669/move-a-selection-to-specific-x-y-position-in-photoshop (Year: 2011).*

YouTube video by username DCP Web Designers, "How to Animate Text in Powerpoint," published Dec. 29, 2019, downloaded from https://www.youtube.com/watch?v=5f8Fn2UuNao (Year: 2019).*

Ispring website, "How to animate text by letter, word or paragraph in PowerPoint," dated Jun. 8, 2015, downloaded from https://www.ispringsolutions.com/blog/how-to-animate-text-by-letter-word-or-paragraph-in-powerpoint (Year: 2015).*

Chinese Office Action for CN 202010085287.8, dated Jan. 12, 2021.
Chinese Office Action for CN 202010085287.8, dated Jun. 15, 2021.
International Search Report for PCT/CN2020/126142, dated Feb. 8, 2021.
Witten Opinion for PCT/CN2020/126142, dated Feb. 8, 2021.

* cited by examiner

BULLET SCREEN PROCESSING METHOD AND APPARATUS, ELECTRONIC DEVICE, AND COMPUTER-READABLE STORAGE MEDIUM

CROSS-REFERENCE TO RELATED APPLICATION(S)

This application is a continuation application of International Application No. PCT/CN2020/126142, filed Nov. 3, 2020, which claims priority to Chinese Patent Application No. 202010085287.8 filed with the China National Intellectual Property Administration on Feb. 10, 2020, the disclosures of which are incorporated by reference in their entireties.

FIELD

Embodiments of the present disclosure relate to Internet technologies, and in particular, to a bullet screen processing method and apparatus, an electronic device, and a computer-readable storage medium.

BACKGROUND

With the development of Internet technologies and multimedia technologies, a new content display manner, namely the bullet screen content display, gradually emerges, and is widely applied to scenarios such as video playback and live streaming interaction. The bullet screen content is generally displayed in the multimedia playback interface, so that the user can watch the bullet screen content at the same time when viewing the multimedia information. For example, when the multimedia information is a video and the bullet screen content is a user comment, a plurality of pieces of bullet screen content may be displayed in the video playback interface in a scrolling manner according to the sequence of the sending time of the plurality of pieces of bullet screen content.

SUMMARY

The technical solutions in embodiments of the present disclosure are implemented as follows:

The embodiments of the present disclosure provide a bullet screen processing method, performed by an electronic device, the method including:
  displaying a bullet screen editing interface in response to a bullet screen editing operation received during playback of multimedia information;
  receiving bullet screen content by using the bullet screen editing interface, and receiving, by using the bullet screen editing interface, a bullet screen style set for the bullet screen content, attributes of the bullet screen style including a shape of the bullet screen content; and
  transmitting the bullet screen content and the bullet screen style, to display, in a multimedia playback interface, the bullet screen content conforming to the bullet screen style.

The embodiments of the present disclosure provide a bullet screen processing apparatus, including: at least one memory configured to store program code; and at least one processor configured to read the program code and operate as instructed by the program code, the program code including:
  displaying code configured to cause the at least one processor to display a bullet screen editing interface in response to a bullet screen editing operation received during playback of multimedia information;
  receiving code configured to cause the at least one processor to receive bullet screen content by using the bullet screen editing interface, and receive, by using the bullet screen editing interface, a bullet screen style set for the bullet screen content, attributes of the bullet screen style including a shape of the bullet screen content; and
  transmission code configured to cause the at least one processor to transmit the bullet screen content and the bullet screen style, to display, in a multimedia playback interface, the bullet screen content conforming to the bullet screen style.

The embodiments of the present disclosure provide an electronic device, including:
  a memory, configured to store executable instructions; and
  a processor, configured to implement, when executing the executable instructions stored in the memory, the bullet screen processing method provided in the embodiments of the present disclosure.

The embodiments of the present disclosure provide a non-transitory computer-readable storage medium, storing at least one instruction executable by a processor to: display a bullet screen editing interface in response to a bullet screen editing operation received during playback of multimedia information; receive bullet screen content by using the bullet screen editing interface, and receive, by using the bullet screen editing interface, a bullet screen style set for the bullet screen content, attributes of the bullet screen style comprising a shape of the bullet screen content; and transmit the bullet screen content and the bullet screen style to display, in a multimedia playback interface, the bullet screen content conforming to the bullet screen style.

DETAILED DESCRIPTION

Figure 1:
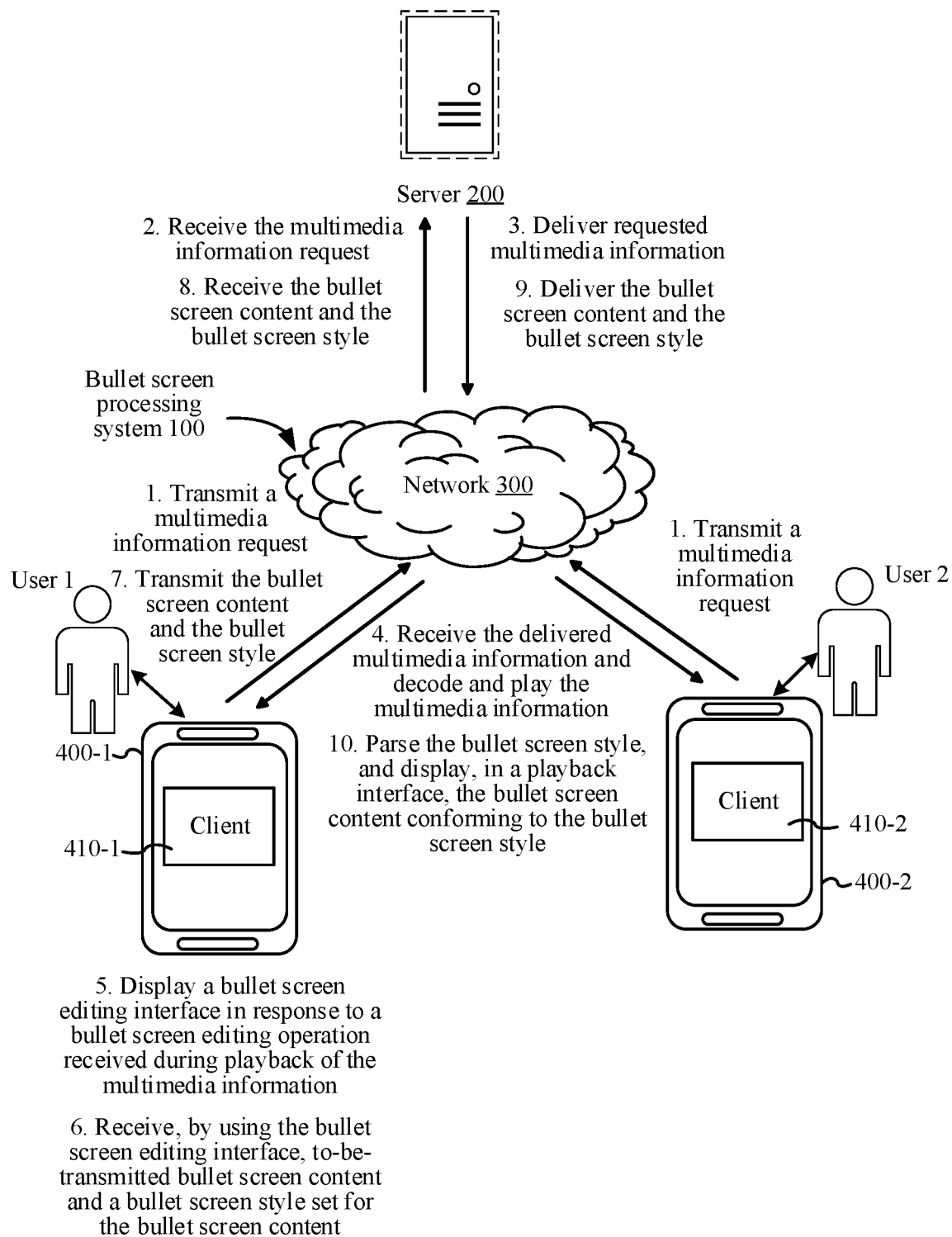
FIG. 1 is a schematic architectural diagram of a bullet screen processing system according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Unless otherwise defined, meanings of all technical and scientific terms used in the present specification are the same as those usually understood by a person skilled in the art to which the present disclosure belongs. Terms used in the present specification are merely intended to describe objectives of the embodiments of the present disclosure, but are not intended to limit the present disclosure.

Before the embodiments of the present disclosure are further described in detail, nouns and terms involved in the embodiments of the present disclosure are described. The nouns and terms provided in the embodiments of the present disclosure are applicable to the following explanations.

1. Bullet screen content: Bullet screen content may come from different users, and is used for commenting on multimedia information or used for interaction based on the multimedia information. During display of the bullet screen content, the bullet screen content may be displayed in the playback interface of the multimedia information. In some embodiments, bullet screen content may be referred to as or may include overlay comments.

2. Multimedia information: Media refers to a carrier that carries and transmits specific information or substances. In the field of computers, media is mainly a carrier for transmitting and storing information. The transmitted information includes voice, text, video, audio, and the like. Multimedia information refers to the display in the form of text, audio, or video in the interactive interface through the integration of functions of various media.

3. Bullet screen style: The bullet screen style refers to attributes/characteristics related to visual performance of bullet screen content, that is, the style in which the bullet screen content is displayed. In the embodiments of the present disclosure, the attributes of the bullet screen style include at least the shape of the bullet screen content (that is, the shape/contour of the bullet screen content).

The attributes of the bullet screen style may further include an arrangement manner of the bullet screen content, a size of the bullet screen content, a color of the bullet screen content, a special effect of the bullet screen content, or the like. In addition, types of the bullet screen style may include a static bullet screen (corresponding to a static display effect) and a dynamic bullet screen (corresponding to a dynamic display effect).

In addition, "plurality of" mentioned in the specification means two or more. the character "/" in this specification indicates an "or" relationship between the associated objects.

For the display of bullet screen content, the prior art provides solutions in which bullet screen content transmitted by a user floats across the playback interface of multimedia information in the form of a line of text, which is displayed in a single form, and the bullet screen content transmitted by the use cannot be displayed in a differentiated manner, which affects the user experience. In addition, the displayed bullet screen content, as displayed in prior art, fails to attract the attention of users, resulting in waste of computing resources consumed by the electronic device during the display of the bullet screen content, that is, low actual utilization of the computing resources of the electronic device.

In view of this, the embodiments of the present disclosure provide a bullet screen processing method and apparatus, an electronic device, and a computer-readable storage medium, to increase display forms of bullet screen content, increase fun of the bullet screen content, and also enhance the actual utilization of computing resources consumed by the electronic device during display of the bullet screen content.

The following describes exemplary applications of the electronic device provided in the embodiments of the present disclosure. The electronic device provided in the embodiments of the present disclosure may be implemented as various types of user terminals such as a notebook computer, a tablet computer, a desktop computer, a set-top box, or a mobile device (for example, a mobile phone, a portable music player, a personal digital assistant (PDA)), a dedicated messaging device, or a portable game device), or may be implemented as a server or a server cluster, or may be implemented by a user terminal and a server collaboratively. An exemplary application in which the electronic device is implemented as a user terminal will be described below.

FIG. 1 is an example schematic architectural diagram of a bullet screen processing system 100 according to an embodiment of the present disclosure. A user terminal 400-1 and a user terminal 400-2 are connected to a server 200 by using a network 300. The network 300 may be a wide area network, a local area network, or a combination of thereof.

As shown in FIG. 1, a client 410-1 on the user terminal 400-1 requests multimedia information from the server 200 by using the network 300. Types of the multimedia information include audio, video, and the like. The server 200 transmits the multimedia information requested by the client 410-1 to the client 410-1, so that the client 410-1 performs decoding and playback. In FIG. 1, multimedia information played by a client 410-2 is the same as the multimedia information played by the client 410-1.

In a process in which the client 410-1 plays the multimedia information, the client 410-1 receives bullet screen content submitted by a user 1 and transmits the bullet screen content to the server 200. Subsequently, the server 200 transmits the bullet screen content submitted by the user 1 and the multimedia information to clients (including the client 410-1 and the client 410-2) requesting the multimedia information. The client 410-1 and the client 410-2 display bullet screens in the multimedia playback interface during decoding and playing data stream of the multimedia information, for example, display a plurality of pieces of bullet screen content in sequence according to a sequence in which the bullet screen content is transmitted to the server; in another example, display a plurality of pieces of bullet screen content in sequence according to time points of the multimedia information that correspond to the bullet screen content (for example, if a specific piece of bullet screen content is transmitted by a user at the $10^{th}$ second of the multimedia information, the time point of the multimedia information corresponding to the bullet screen content is the $10^{th}$ second).

For the display of each piece of bullet screen content, the embodiments of the present disclosure provide a bullet screen processing method, to enable a user to customize a bullet screen style for to-be-transmitted bullet screen content when the user transmits a bullet screen. In the present specification, the to-be-transmitted bullet screen content may be used interchangeably with bullet screen content or bullet screen content to be transmitted. Exemplarily, in response to a bullet screen editing operation received during the playback of the multimedia information, the client 410-1 displays a bullet screen editing interface, and receives, by using the bullet screen editing interface, to-be-transmitted bullet screen content and a bullet screen style set for the bullet screen content. Subsequently, the client 410-1 transmits the bullet screen content inputted by the user 1 and the bullet screen style set for the bullet screen content to the server 200. The server 200 may deliver the bullet screen content and the bullet screen style to all clients (which may include the client 410-1) playing the same multimedia information as the client 410-1, and each client parses the received bullet screen style, and displays the bullet screen content conforming to the bullet screen style in a playback interface.

In some embodiments, there may be only one user terminal in FIG. 1. Using the user terminal 400-1 as an example, the client 410-1 may directly display bullet screen content inputted by a user according to a bullet screen style set by the user, that is, display the bullet screen content in an offline mode without interaction with the server 200. Alternatively, the client 410-1 transmits the bullet screen style and the bullet screen content to the server 200. After the server 200 receives the bullet screen content and the bullet screen style set for the bullet screen content that are transmitted by the client 410-1, the server may return the bullet screen content and the bullet screen style to only the client 410-1, so that the bullet screen content conforming to the bullet screen style is displayed only in the multimedia playback interface of the client 410-1.

In some embodiments, the user terminal may implement the bullet screen processing method provided in the embodiments of the present disclosure by running a computer program. For example, the computer program may be a native program or a software module in an operating system, may be a native application (APP), that is, an application that needs to be installed in an operating system to run, or may be an applet, that is, a program that only needs to be downloaded to a browser environment to run, or may be an applet that can be embedded in any APP. In summary, the computer program may be any form of APP, module or plug-in.

The embodiments of the present disclosure may be implemented by using cloud technology. The cloud technology is a hosting technology that unifies a series of resources such as hardware, software, and networks in a wide area network or a local area network to implement computing, storage, processing, and sharing of data. In another sense, the cloud technology is also a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources.

In some embodiments, the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. For example, the cloud service may be a multimedia information service for the user terminal to call. The user terminal and the server may be directly or indirectly connected in a wired or wireless communication manner. This is not limited in this embodiment of the present disclosure.

Figure 2:
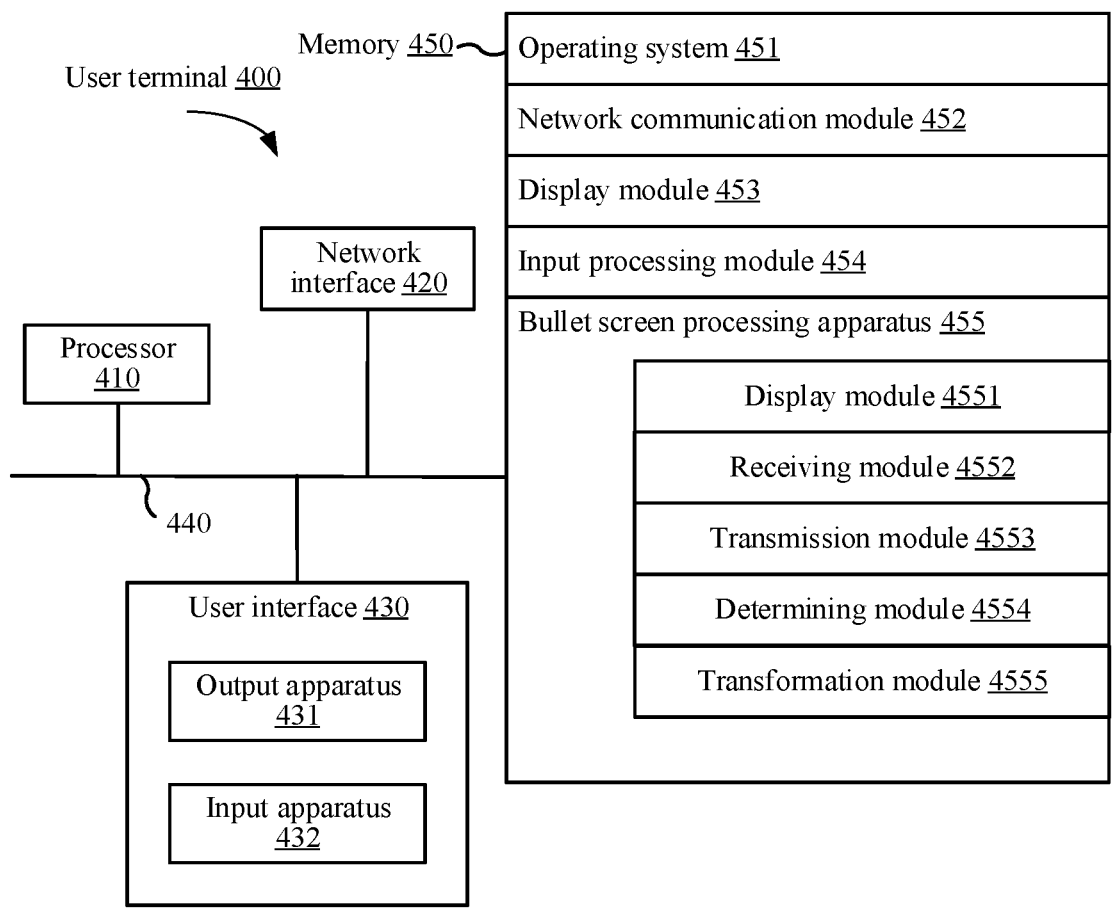
FIG. 2 is a schematic structural diagram of an electronic device according to an embodiment of the present disclosure.

FIG. 2 is a schematic structural diagram of an electronic device according to an embodiment of the present disclosure. The user terminal 400 shown in FIG. 2 includes at least one processor 410, a memory 450, at least one network interface 420, and a user interface 430. All the components in the user terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses are marked as the bus system 440 in FIG. 2.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that can display media content, including one or more loudspeakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 optionally includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of the present disclosure is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the bullet screen processing apparatus provided by the embodiments of the present disclosure may be implemented by using software. FIG. 2 shows a bullet screen processing apparatus 455 stored in the memory 450, which may be software in the form of program or plug-in, and includes the following software modules: a display module 4551, a receiving module 4552, and a transmission module 4553. In some embodiments, the apparatus may further include a determining module 4554 and a transformation module 4555. The modules are logical, and therefore, the modules may be randomly combined or further divided according to implemented functions. For ease of description in FIG. 2, the modules are shown at once. However, it is not to be considered that an implementation in which the bullet screen processing apparatus 455 may include only the display module 4551, the receiving module 4552, and the transmission module 4553 is excluded. Functions of the modules are described below.

With reference to an exemplary application in which the electronic device provided in the above embodiment of the present disclosure is implemented as a user terminal, descriptions are made by using an example in which the bullet screen processing method provided in the embodiments of the present disclosure is implemented in a client run on the user terminal.

The client may be various types of dedicated clients (native APPs), such as a video player, an audio player, a short video APP, and a live broadcast APP, or may be a browser that plays video, audio, and other types of multimedia information through a web page, or may be various network applications (such as a social network APP) running multimedia playback applets, including a browser environment for running the multimedia playing applets.

Figure 3A:
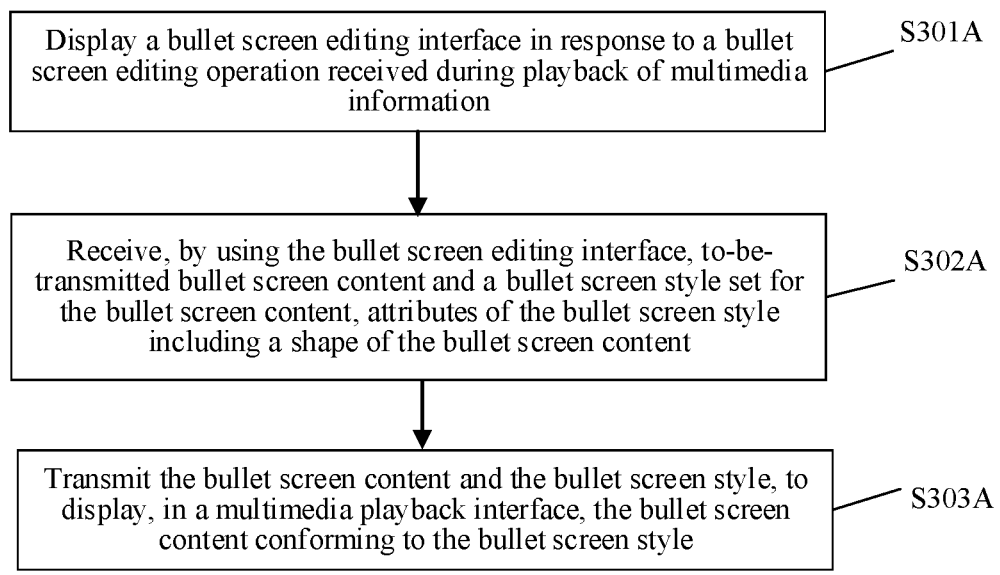
FIG. 3A is a schematic flowchart of a bullet screen processing method according to an embodiment of the present disclosure.

FIG. 3A is an example schematic flowchart of a bullet screen processing method according to an embodiment of the present disclosure, which will be described with reference to steps and/or operations shown in FIG. 3A. Operation S301A: A client displays a bullet screen editing interface in response to a bullet screen editing operation received during playback of multimedia information. Operation S302A: The client receives, by using the displayed bullet screen editing interface, to-be-transmitted bullet screen content and a bullet screen style set for the bullet screen content, attributes of the bullet screen style including a shape of the bullet screen content. Operation S303A: The client transmits the received bullet screen content and the bullet screen style, to display, in a multimedia playback interface, the bullet screen content conforming to the bullet screen style. Thus, a user may customize a shape for bullet screen content when transmitting a bullet screen, greatly enriching display forms of the bullet screen content. When the client displays the bullet screen content in a custom shape, the probability that the bullet screen content draws attention of users can be increased, thereby improving the actual utilization of computing resources consumed by the client during display.

Figure 3B:
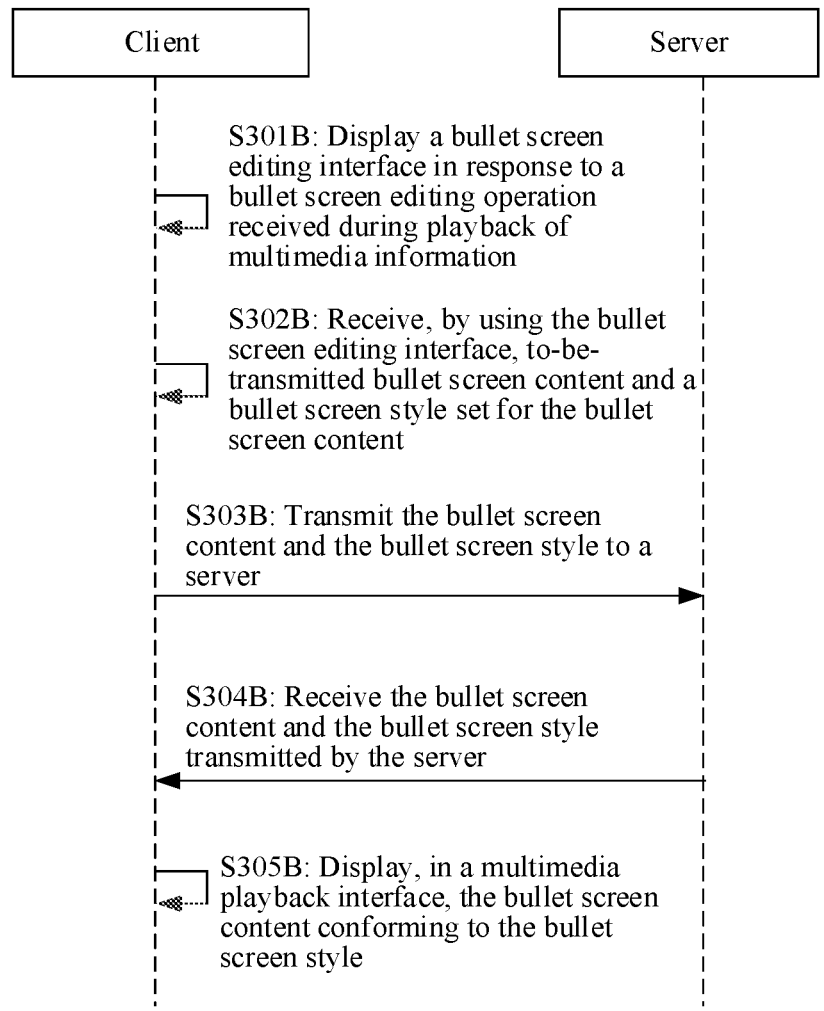
FIG. 3B is a schematic flowchart of a bullet screen processing method according to an embodiment of the present disclosure.

Descriptions are made in detail below by using an example in which the client and the server perform the bullet screen processing method provided in the embodiments of the present disclosure in cooperation. FIG. 3B is a schematic flowchart of a bullet screen processing method according to an embodiment of the present disclosure, which will be described with reference to operations shown in FIG. 3B.

Operation S301B: A client displays a bullet screen editing interface in response to a bullet screen editing operation received during playback of multimedia information.

In some embodiments, the client requests the multimedia information from a server, and decodes and plays the multimedia information delivered by the server. When the bullet screen editing operation is received during playback of the multimedia information, it indicates that a user wants to edit a bullet screen at this time, and the client displays the bullet screen editing interface in response to the bullet screen editing operation.

The bullet screen editing operation may be a screen touch operation performed by the user on a multimedia playback interface (that is, a playback interface of the multimedia information). For example, when it is detected that the user performs a screen touch operation on the multimedia playback interface currently playing the multimedia information, the bullet screen editing interface is displayed. The screen touch operation may include a sliding gesture operation, a double-click/tap operation, a long-press operation, or the like. The user may flexibly set different screen touch operations as bullet screen editing operations according to requirements of the user, so as to customize the bullet screen editing operations. For example, the user may set a double-click/tap operation as the bullet screen editing operation. When detecting a double-click/tap operation on the multimedia playback interface, the client displays the bullet screen editing interface.

The type of the bullet screen editing operation is not limited to a screen touch operation and, for example, may be a voice operation, operations based on various user interface components (such as a keyboard and a mouse), or a non-touch gesture operation. The type of the bullet screen editing operation is not limited in the embodiments of the present disclosure.

The relationship between interfaces is not limited in the above embodiment of the present disclosure. Using the multimedia playback interface and the bullet screen editing interface as an example, the bullet screen editing interface displayed by the client when the client receives the bullet screen editing operation may be used for completely overlaying the multimedia playback interface, and the bullet screen editing interface may be alternatively a window-like interface, which is used for overlapping a part of the multimedia playback interface, so that the user can edit a bullet screen while viewing the multimedia information.

Operation S302B: The client receives to-be-transmitted bullet screen content by using the bullet screen editing interface, and receiving, by using the bullet screen editing interface, a bullet screen style set for the bullet screen content.

The bullet screen editing interface is used for providing a function for inputting the bullet screen content and a function for setting the bullet screen style for the bullet screen content. The user may input the bullet screen content and set the bullet screen style according to actual requirements. Attributes of the bullet screen style include the shape of the bullet screen content, but do not constitute a limitation on embodiments of the present disclosure. For example, the attributes of the bullet screen style may further include the color, size, special effect, and arrangement manner of the bullet screen content.

In some embodiments, the types of the bullet screen style include a static bullet screen and a dynamic bullet screen. the receiving, by using the bullet screen editing interface, a bullet screen style set for the bullet screen content may be implemented in such a manner: The client determines a new bullet screen style including a set bullet screen type in response to a setting operation for a bullet screen type of the bullet screen content, and displays, in the bullet screen editing interface, the bullet screen content applying the new bullet screen style; and determines, when the setting operation is no longer received in a predetermined time or a bullet screen transmission operation is received, the new bullet screen style as the bullet screen style set for the bullet screen content.

In the above embodiments of the present disclosure, a function for setting the types of the bullet screen style may be provided in the bullet screen editing interface. The types of the bullet screen style include a static bullet screen and a dynamic bullet screen. The client determines a new bullet screen style including a set bullet screen type when receiving a setting operation for a bullet screen type of the bullet screen content by using the bullet screen editing interface. To help the user to determine whether the new bullet screen style meets the requirements of the user, the client displays, in the bullet screen editing interface, the bullet screen content applying the new bullet screen style, for example, may display in the style preview region of the bullet screen editing interface. The client determines, when the setting operation is no longer received in a predetermined time or a bullet screen transmission operation is received, the new bullet screen style as the bullet screen style set for the bullet screen content.

The static bullet screen means that when the bullet screen content is displayed in the multimedia playback interface, the attributes (which includes the shape of a bullet screen, and may further include the color, size, special effect, and arrangement manner of the bullet screen content) of the bullet screen style remain unchanged. The dynamic bullet screen means that when the bullet screen content is displayed in the multimedia playback interface, the attributes of the bullet screen style are changing.

Exemplarily, when the bullet screen type is set to a static bullet screen, during the display of the bullet screen content in the multimedia playback interface, the attributes of the bullet screen style applied to the bullet screen content remains unchanged. For example, if the bullet screen content is in a heart shape, in the display process of the bullet screen content (such as the process of moving from one end of the multimedia playback interface to the other end), the bullet screen content is always displayed in a heart shape.

Exemplarily, when the bullet screen type is set to a dynamic bullet screen, during the display of the bullet screen content in the multimedia playback interface, the attributes of the bullet screen style applied to the bullet screen content are changing. The attributes of the bullet screen style may keep changing, or may change only in a part of time displayed in the multimedia playback interface (for example, may change in first few seconds of display, or change in the last few seconds of display, or change every few seconds). The change manner of the attributes of the bullet screen style may be randomly changing or may be set by the user. For example, for a dynamic bullet screen, when the user does not extra set the change manner of the attributes, a default change manner is adopted. Through the above-mentioned methods, the bullet screen can be processed more comprehensively, which meets requirements of the user for setting the bullet screen style.

The user may also set the attributes of the bullet screen style and the types of the bullet screen style in the bullet screen editing interface. For example, after setting the new shape of the bullet screen content, the user may further set other attributes (such as the color, the size, the special effect, and the arrangement manner) of the bullet screen style, and the types of the bullet screen style. When the user only sets the shape of the bullet screen content without setting the other attributes and the types, the other attributes and the types of the bullet screen style may be set randomly or by default.

In some embodiments, the receiving, by using the bullet screen editing interface, a bullet screen style set for the bullet screen content may be alternatively implemented in such a manner: The client displays, in the bullet screen editing interface, candidate bullet screen styles corresponding to the bullet screen content, and determines, in response to a selection operation on the candidate bullet screen styles corresponding to the bullet screen content, the selected candidate bullet screen style as the bullet screen style set for the bullet screen content; or displays, in the bullet screen editing interface, the candidate bullet screen styles corresponding to the bullet screen content, determines similarities between feature vectors of the candidate bullet screen styles and a feature vector of a bullet screen editing account in response to a setting operation of automatically setting a bullet screen style for the bullet screen content, and determines the candidate bullet screen style with the highest similarity as the bullet screen style set for the bullet screen content, the bullet screen editing account being a user account editing the bullet screen style.

In the above embodiments of the present disclosure, in addition to manually setting the bullet screen style, the user may also select the bullet screen style. Alternatively, the client may automatically select the bullet screen style.

For example, the client may display, in the bullet screen editing interface, at least one candidate bullet screen style corresponding to the bullet screen content. The user may select any candidate bullet screen style through a preset operation (including but not limited to, three-finger pull-down or four-finger click/tap). For one selected candidate bullet screen style, the client may directly use the candidate bullet screen style as the bullet screen style set for the bullet screen content, or may further adjust the candidate bullet screen style, for example, display the style editing interface for the user to adjust the candidate bullet screen style. Through the method, the bullet screen style can be quickly determined without manual setting by the user, thereby improving the user experience.

In another example, after the client displays at least one candidate bullet screen style in the bullet screen editing interface, the client may perform automatic selection in response to the setting operation of automatically setting a bullet screen style for the bullet screen content. This embodiment of the present disclosure provides two examples of automatic selection, but they are not intended to be a limitation on examples of automatic selection. The first example is that the client randomly selects a candidate bullet screen style from the at least one displayed candidate bullet screen style, and determines the selected candidate bullet screen style as the bullet screen style set for the bullet screen content. The second example is that for each displayed candidate bullet screen style, the client determines the similarities between the feature vectors of the candidate bullet screen styles and the feature vector of the bullet screen editing account, and determines the candidate bullet screen style with the highest similarity as the bullet screen style set for the bullet screen content to implement intelligent selection. The bullet screen editing account is a user account editing the bullet screen style, for example, a user account in a login state in the client. Through the method, the automatic selection of the candidate bullet screen styles is implemented, and user operations are further reduced.

In some embodiments, Before the client displays, in the bullet screen editing interface, the candidate bullet screen styles corresponding to the bullet screen content, the method further includes: performing at least one of the following operations by the client: obtaining a bullet screen style used by a user account having a potential friendship with the bullet screen editing account as a candidate bullet screen style; obtaining a bullet screen style used by a user account having a social relationship with the bullet screen editing account as a candidate bullet screen style; or obtaining a bullet screen style with a usage frequency greater than a frequency threshold or a score greater than a score threshold as a candidate bullet screen style.

For example, the client may periodically or irregularly obtain new candidate bullet screen styles from a backend (that is, the server). The new candidate bullet screen styles may include at least one of the following: the bullet screen style used by the user account having a potential friendship with the bullet screen editing account, where when a similarity between a user feature of the bullet screen editing account (the user feature may include a vector representation of multimedia information viewed/liked/forwarded by the bullet screen editing account) and a user feature of a specific user account is greater than the similarity threshold, the user account is used as the user account having a potential friendship with the bullet screen editing account; the bullet screen style used by the user account having a social relationship (such as a friendship or a "followed" relationship) with the bullet screen editing account, where the social relationship may be subscription, follow, interaction (such as liking, sending electronic red envelopes, or sharing multimedia information), or the like, which is not limited; or bullet screen styles with high frequencies/high scores counted by the server from different dimensions, where a high frequency may mean that the usage frequency of the bullet screen style is greater than the frequency threshold, and a high score may mean that the score of the bullet screen style is greater than the score threshold. The user (referring to a user who uses the bullet screen editing account) is more likely to be interested in the obtained candidate bullet screen style, thereby helping the user to set a satisfactory bullet screen style more quickly for the bullet screen content.

Exemplarily, when the user is editing a bullet screen, the client may randomly apply different candidate bullet screen styles or apply different candidate bullet screen styles in turn to bullet screen content inputted by the user, and may provide a preview entry and a switch entry of the candidate bullet screen styles to allow the user to watch the preview effect of the candidate bullet screen style by using the preview entry, so as to determine whether the candidate bullet screen style meets requirements of the user, or quickly switch the applied candidate bullet screen styles by using the switch entry, until a satisfactory bullet screen style is selected.

In some embodiments, an artificial intelligence solution may be used for effectively helping the user determine a satisfactory bullet screen style. For example, a model for predicting a bullet screen style is trained by using a machine learning method, and the trained model is used for predicting, based on a current usage scenario of the user (for example, at least one of the name, type, and length of multimedia information currently viewed by the user) and user portrait data, a bullet screen style that the user tends to use. The method may be applied to a scenario in which the client automatically selects a candidate bullet screen style as the bullet screen style set for the bullet screen content.

Exemplarily, known user portrait data, user usage scenarios, and applied bullet screen styles are used as samples for training the model, and the machine learning method is used for training the model, so that the trained model has the ability to predict, based on current usage scenarios of the user and the user portrait data, a bullet screen style that the user is interested in. A loss function of the model may be various loss functions, such as a regression loss function, a squared error loss function, an absolute error loss function, or a cross-entropy loss function. The loss function is used for representing the difference between the predicted bullet screen style and an actual applied bullet screen style. A type of the model may be various machine learning models, such as a classification and regression tree model, a neural network model, or various derived grid-based models.

In some embodiments, after operation S301B, the method further includes: transmitting the bullet screen content and the default bullet screen style to the server when the client receives the to-be-transmitted bullet screen content by using the bullet screen editing interface and does not receive the bullet screen style set for the bullet screen content, to display, in the multimedia playback interface, the bullet screen content conforming to the default bullet screen style.

When the client only receives the bullet screen content and does not receive the bullet screen style, the default bullet screen style may be used as the bullet screen style set for the bullet screen content. The default bullet screen style may be a line of text. The default bullet screen style may be alternatively set according to actual application scenarios.

Figure 4:
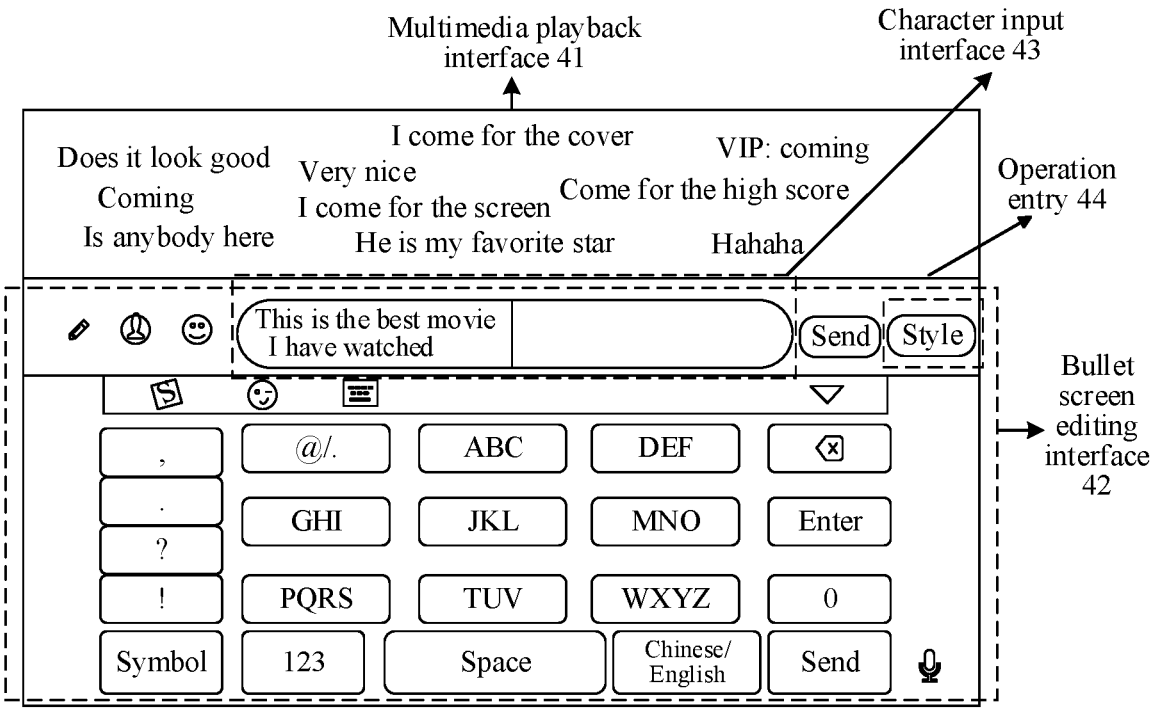
FIG. 4 is a schematic diagram of a bullet screen editing interface according to an embodiment of the present disclosure.

Exemplarily, as shown in FIG. 4, after the user inputs the to-be-transmitted bullet screen content into a text box (a character input interface) of the bullet screen editing interface, and directly clicks/taps a "Send" button, the client transmits the bullet screen content and the default bullet screen style to the server, and the bullet screen content will be displayed in the multimedia playback interface of the client in the form of a line of text.

Operation S303B: The client transmits the bullet screen content and the bullet screen style to the server.

In some embodiments, the client transmits the bullet screen content and the bullet screen style set for the bullet screen content to the server when the setting operation for the bullet screen style is no longer received in a predetermined time or a bullet screen transmission operation is received. The predetermined time may be adjusted according to actual application scenarios.

Figure 5A:
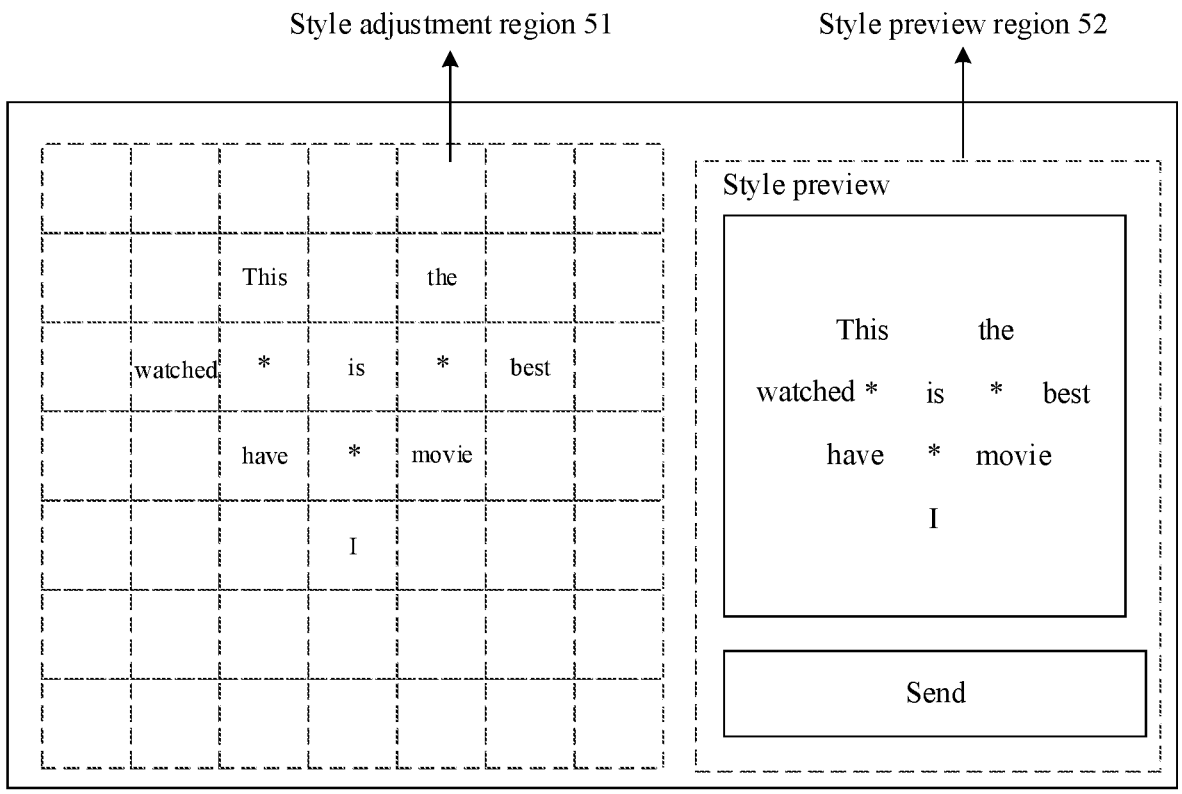
FIG. 5A is a schematic diagram of a style editing interface according to an embodiment of the present disclosure.

Exemplarily, referring to FIG. 5A, when the setting operation for the bullet screen style is not received within the predetermined time (for example, within 20 seconds) in a style adjustment region, or when a click/tap operation performed by the user on the "Send" button in the style preview region is received, the bullet screen content and the bullet screen style set for the bullet screen content are transmitted to the server. The style adjustment region and the style preview region are described later.

Operation S304B: The client receives the bullet screen content and the bullet screen style transmitted by the server.

Operation S305B: The client displays, in a multimedia playback interface, the bullet screen content conforming to the bullet screen style.

In some embodiments, the client may transmit, by using the server, the bullet screen content and the bullet screen style to all clients (or web page playback interfaces) that are playing the same multimedia information and are in an online state, so that the bullet screen content conforming to the bullet screen style is displayed in all multimedia playback interfaces playing the same multimedia information.

Exemplarily, in an example in which clients 1 to N are playing the same multimedia information currently, and N is an integer greater than 1, in the process of playing the multimedia information, the client 1 receives to-be-transmitted bullet screen content inputted by a user 1 and a bullet screen style set for the bullet screen content, and the client 1 then transmits the bullet screen content and the bullet screen style to the server. After receiving the bullet screen content and the bullet screen style transmitted by the client 1, the server transmits the bullet screen content and the bullet screen style to the clients 1 to N, so that the bullet screen content conforming to the bullet screen style is displayed on multimedia playback interfaces of the clients 1 to N.

In the above embodiments of the present disclosure, the client may include an enable/disable function of bullet screens. The bullet screen content conforming to the bullet screen style is displayed in the multimedia playback interface of the client only when the client enables a bullet screen function. When the client disables the bullet screen function, no bullet screen content is displayed in the multimedia playback interface of the client.

In some embodiments, the client may transmit, by using the server, the bullet screen content and the bullet screen style to a client (or a web page playback interface) that is playing the same multimedia information and is associated with a user account having a potential friendship with a bullet screen editing account. The bullet screen editing account is a user account editing the bullet screen style. The user account having a potential friendship with the bullet screen editing account may be determined by using the following method: when receiving bullet screen content and bullet screen style transmitted by a user account A for multimedia information, extracting a user feature of the user account A according to portrait data of the user account A, calculating similarities between the user feature of the user account A and user features of online user accounts currently viewing the same multimedia information, determining the user account with the similarity higher than a similarity threshold as the user account having a potential friendship with the user account A, and then transmitting the bullet screen content and the bullet screen style to a client associated with the user account having a potential friendship.

For the user account with the similarity between the user features lower than the similarity threshold (that is, the user account that does not have a potential friendship with the bullet screen editing account), the bullet screen content applying the default bullet screen style may be transmitted to a client to which the user account is associated, or the bullet screen content and the bullet screen style (including a shielding identification to instruct not to apply the bullet screen style) are transmitted to the client, so that the bullet screen content may be displayed in the default bullet screen style in a multimedia playback interface of the client to which the user account is associated.

In some embodiments, the client may transmit, by using the server, the bullet screen content and the bullet screen style to a client (or a web page playback interface) that is playing the same multimedia information and is associated with a user account selected by the bullet screen editing account.

Exemplarily, the bullet screen editing interface may further provide an audience setting interface of the bullet screen style for the user to select some specific user accounts with social relationships as audience. A selected dimension may be one type of social relationship or a plurality of types of social relationships, or one or more user accounts in each type of social relationship. Alternatively, bullet screen styles may be set for different types of social relationships in a one-to-one correspondence. The social relationship may be subscription, follow, interaction (such as liking, sending electronic red envelopes, or sharing multimedia information), or the like. Thus, the server can send the bullet screen content and the bullet screen style to only the client (or a web page playback interface) that is playing the same multimedia information and associated with the user account selected by the bullet screen editing account, so that the bullet screen content conforming to the bullet screen style is displayed in a multimedia playback interface of the client associated with the selected user account, and the bullet screen content is displayed in the default bullet screen style in a multimedia playback interface of a client associated with an unselected user account.

In an example in which the clients 1 to N are playing the same multimedia information currently, and N is an integer greater than 4, in the process of playing the multimedia information, the client 1 receives to-be-transmitted bullet screen content inputted by a user 1 and a bullet screen style set for the bullet screen content, and receives user accounts associated with a client 2 and a client 3 by audience of the bullet screen style set by the user 1. Subsequently, the client 1 then transmits the bullet screen content, the bullet screen style, and the user accounts of the audience to the server. After receiving the bullet screen content, the bullet screen style, and the user accounts of the audience transmitted by the client 1, the server transmits the bullet screen content and the bullet screen style to the clients 1 to 3, so that the bullet screen content conforming to the bullet screen style is displayed in multimedia playback interfaces of the clients 1 to 3. In addition, the server may transmit the bullet screen content and the default bullet screen style or the bullet screen content and the bullet screen style (including a shielding identification to instruct not to apply the bullet screen style) to the clients 4 to N, so that the clients 4 to N display, in the default bullet screen style, the bullet screen content transmitted by the user 1. Thus, through differentiated display, the bullet screen processing is more targeted, so that interaction with specific user accounts is more convenient.

In some embodiments, the client may transmit, by using the server, the bullet screen content and the bullet screen style to a client associated with an active user account, so that the bullet screen content conforming to the bullet screen style is displayed in a multimedia playback interface of a client associated with the active user account. In addition, the server transmits the bullet screen content and the default bullet screen style or the bullet screen content and the bullet screen style (including a shielding identification to instruct not to apply the bullet screen style) to a client associated with a non-active user account, so that the bullet screen content is displayed in the default bullet screen style in a multimedia playback interface of a client associated with the non-active user account. The active user account may be a user account whose online duration reaches a preset duration, or a user account with the quantity of transmitted bullet screens exceeding a predetermined quantity.

In some embodiments, the client may randomly transmit, by using the server, the bullet screen content and the bullet screen style to some clients that are playing the same multimedia information, so that the bullet screen content conforming to the bullet screen style is displayed in multimedia playback interfaces of the some selected clients, and the bullet screen content is displayed in the default bullet screen style in a multimedia playback interface of another client.

In the above embodiments of the present disclosure, the server may transmit the bullet screen content inputted by the user and the bullet screen style set for the bullet screen content to a client playing the same multimedia information at the current moment or a client playing the same multimedia information at other time. For example, the backend (the server) screens the bullet screen content inputted by the user and the bullet screen style and then transmits the bullet screen content and the bullet screen style that meet a requirement to a client subsequently playing the same multimedia information.

In some embodiments, the bullet screen content conforming to the bullet screen style may be displayed in the multimedia playback interface by using the following method: The client starts to display the bullet screen content conforming to the bullet screen style from a first end of the multimedia playback interface, and gradually moves the bullet screen content to a second end of the multimedia playback interface, until the bullet screen content is moved out of the multimedia playback interface.

The first end and the second end of the multimedia playback interface are relative terms. For example, the first end may be the right end and the second end may be the left end. In another example, the first end may be the lower end and the second end may be the upper end. The client starts to display the bullet screen content conforming to the bullet screen style from the first end of the multimedia playback interface when receiving the bullet screen content and the bullet screen style, and gradually moving the bullet screen content to the second end of the multimedia playback interface, until the bullet screen content is moved out of the multimedia playback interface.

The above examples do not constitute a limitation on the embodiments of the present disclosure, that is, the bullet screen content conforming to the bullet screen style may be alternatively displayed by using another display method. For example, the client may fixedly display the bullet screen content conforming to the bullet screen style at a display position set in the multimedia playback interface, until a set display duration is reached.

As shown in FIG. 3B, in this embodiment of the present disclosure, the client supports the customization of the shape of the bullet screen content, greatly enriching display forms of the bullet screen content, and meeting requirements of different users. In addition, when the client displays the bullet screen content in a custom shape, the probability that the bullet screen content draws attention of users can be increased, thereby improving the actual utilization of computing resources consumed by the client during display.

Figure 3C:
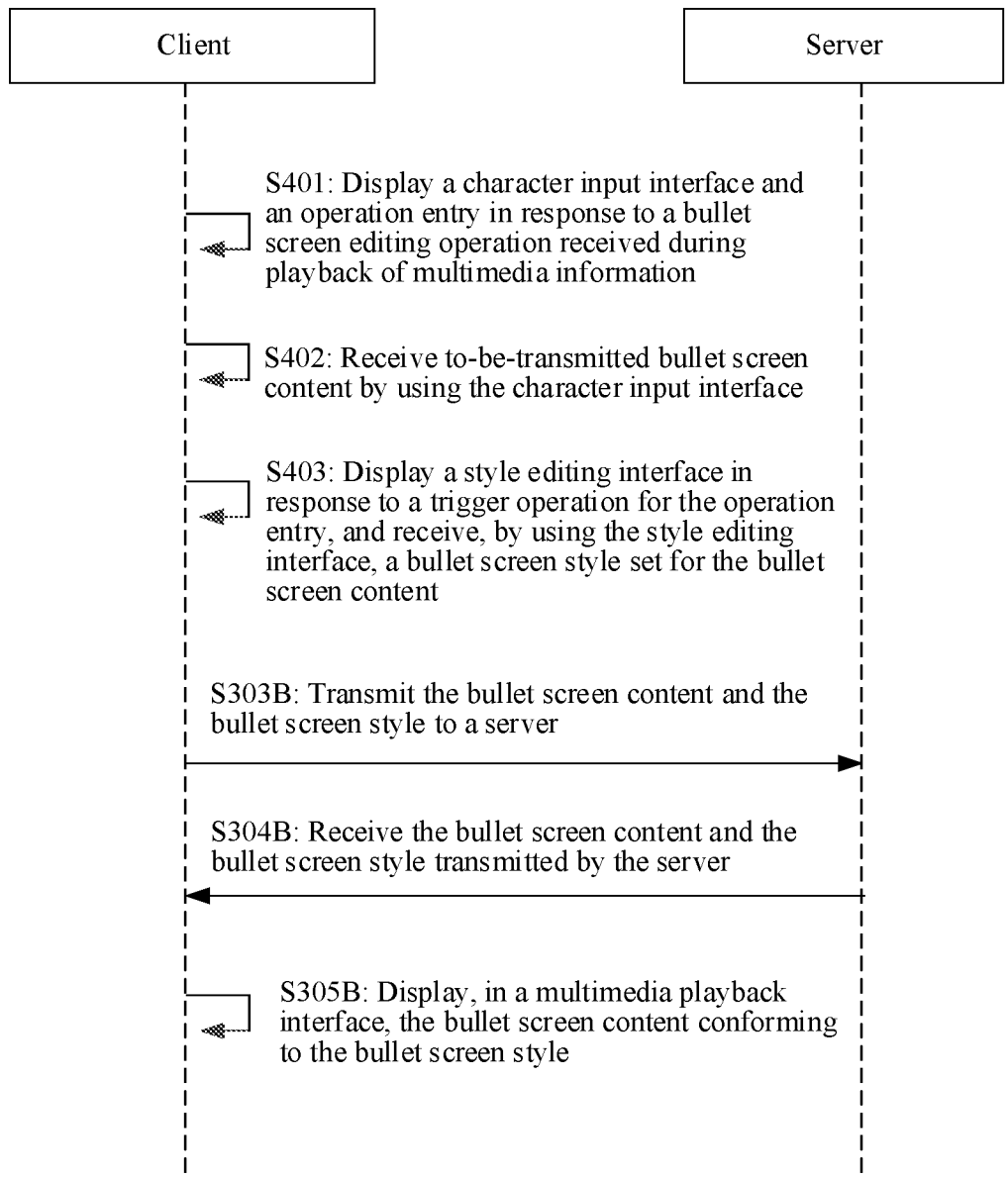
FIG. 3C is a schematic flowchart of a bullet screen processing method according to an embodiment of the present disclosure.

In some embodiments, FIG. 3C is a schematic flowchart of a bullet screen processing method according to an embodiment of the present disclosure. In FIG. 3C, operation S301B shown in FIG. 3B may be updated as operation S401.

Operation S401: The client displays, in response to receiving a bullet screen editing operation during playback of multimedia information, a character input interface used for editing to-be-transmitted bullet screen content and an operation entry used for setting a bullet screen style.

In this embodiment of the present disclosure, the bullet screen editing interface may include the character input interface used for editing the to-be-transmitted bullet screen content and the operation entry used for setting the bullet screen style;

Exemplarily, FIG. 4 is a schematic diagram of a bullet screen editing interface according to an embodiment of the present disclosure. FIG. 4 shows a multimedia playback interface 41. The multimedia playback interface 41 is playing multimedia information and displays a plurality of pieces of bullet screen content simultaneously, such as "Does it look good" and "Hahaha" in FIG. 4. The multimedia playback interface 41 includes a bullet screen editing interface 42, and the bullet screen editing interface 42 includes a character input interface 43 in the form of text box and an operation entry 44.

In FIG. 3C, operation S302B shown in FIG. 3B may be implemented through operation S402 and operation S403, which is described with reference to the operations.

Operation S402: The client receives the to-be-transmitted bullet screen content by using the character input interface.

Exemplarily, referring to FIG. 4, the user may input the to-be-transmitted bullet screen content, for example, "This is the best movie I have watched", in the character input interface 43.

Operation S403: The client displays a style editing interface in response to a trigger operation for the operation entry, and receives, by using the style editing interface, a bullet screen style set for the bullet screen content.

Exemplarily, referring to FIG. 4, when the user clicks/taps the "Style" button (that is, the operation entry 44), the client displays the style editing interface, and receives, by using the style editing interface, the bullet screen style set for the bullet screen content. The style editing interface may completely overlay the bullet screen editing interface 42, or may be displayed in the bullet screen editing interface 42 in the form of a window.

In some embodiments, the displaying a style editing interface, and receiving, by using the style editing interface, a bullet screen style set for the bullet screen content may be implemented in such a manner: The client displays a style adjustment region in the style editing interface, and displays, in the style adjustment region, characters included in the bullet screen content; determines, in response to a shift operation on at least some characters in the bullet screen content, a new bullet screen style including a new shape, and displays, in the style editing interface, the bullet screen content applying the new bullet screen style; and determines, when the shift operation is no longer received in a predetermined time or a bullet screen transmission operation is received, the new bullet screen style as the bullet screen style set for the bullet screen content.

The style editing interface may include the style adjustment region for providing a function for setting the bullet screen style. The style adjustment region initially displays the characters included in the bullet screen content. When receiving the shift operation on at least some characters in the bullet screen content displayed in the style adjustment region, the client uses the latest shape (that is, the shape after the shift) of the bullet screen content as a new shape to obtain the new bullet screen style including the new shape. Subsequently, the client displays, in the style editing interface, the bullet screen content applying the new bullet screen style. The bullet screen content applying the new bullet screen style may be directly displayed in the style adjustment region, or may be displayed in another region. For example, a style preview region is individually divided for displaying the bullet screen content applying the new bullet screen style. The client determines, when the shift operation is no longer received in a predetermined time or a bullet screen transmission operation is received, the new bullet screen style as the bullet screen style set for the bullet screen content.

Exemplarily, FIG. 5A is a schematic diagram of a style editing interface according to an embodiment of the present disclosure. As shown in FIG. 5A, the style editing interface mainly includes a style adjustment region 51 on the left and a style preview region 52 on the right. The structures of the style adjustment region and the style preview region in FIG. 5A are merely an example, and a relative position relationship of the two regions is not limited thereto. For example, the style adjustment region may be located on the right side of the style preview region, or the style adjustment region may be located on the upper side of the style preview region, or the style adjustment region may be located on the lower side of the style preview region. Users are allowed to set relative positions of the style adjustment region and the style preview region according to own habits.

In FIG. 5A, descriptions are made by using an example in which the style adjustment region is a grid region that supports character position adjustment. The grid region includes a plurality of grids, and each grid corresponds to a character. Each grid is implemented by a text input component, which records characters inputted by the user in the grid and coordinates of the grid by monitoring a click/tap event. The style preview region is mainly used for displaying in real time the bullet screen content applying the new shape included in the new bullet screen style.

Figure 5B:
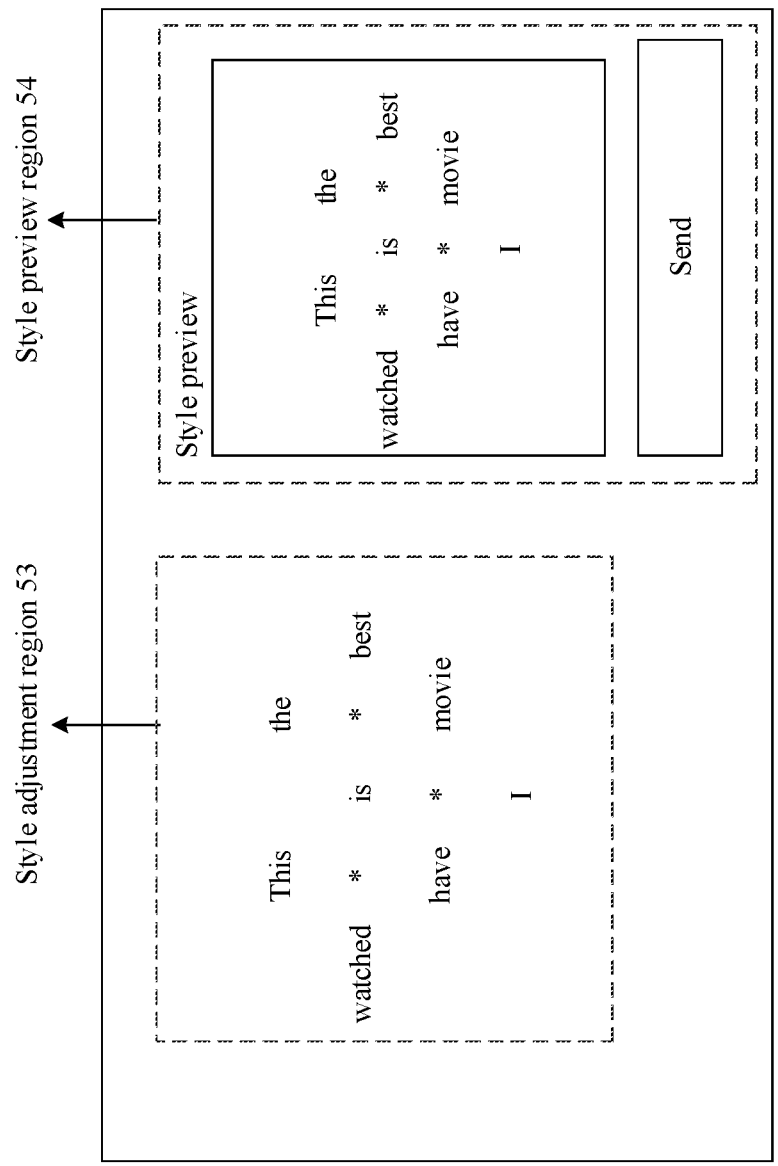
FIG. 5B is a schematic diagram of a style editing interface according to an embodiment of the present disclosure.

Exemplarily, FIG. 5B is a schematic diagram of a style editing interface according to an embodiment of the present disclosure. As shown in FIG. 5B, the style editing interface mainly includes a style adjustment region 53 on the left and a style preview region 54 on the right. In FIG. 5B, descriptions are made by using an example in which the style adjustment region is a pixel region that supports character position adjustment. Coordinates of characters displayed in the style adjustment region are pixel coordinates.

In some embodiments, the displaying, in the style adjustment region, characters included in the bullet screen content may be implemented in such a manner: The client displays, in the style adjustment region, the characters included in the bullet screen content according to a shape in a default bullet screen style.

The bullet screen content received in the character input interface may be displayed in the style adjustment region in the shape in the default bullet screen style. The shape in the default bullet screen style is an initial shape. The shape in the default bullet screen style may be a shape of a line of text. After the client displays, in the style adjustment region, the characters included in the bullet screen content, the user may perform a shift operation on the characters included in the bullet screen content to obtain a new shape. The shift operation may be a drag operation that the user selects a specific character and drags the character to a target position. For example, referring to FIG. 5A, a heart shape shown in FIG. 5A is a new shape obtained after a shift operation, that is, a shape of a line of text is adjusted into the heart shape.

In some embodiments, the displaying, in the style adjustment region, characters included in the bullet screen content may be implemented in such a manner: The client displays, in the style editing interface, candidate bullet screen styles corresponding to the bullet screen content, and displays, in the style adjustment region in response to a selection operation on the candidate bullet screen styles corresponding to the bullet screen content, the characters included in the bullet screen content according to a shape in a selected candidate bullet screen style.

A shape in at least one candidate bullet screen style may be displayed in the style editing interface (such as the style adjustment region). The user may select a desired shape from the shape in the at least one candidate bullet screen style. Next, the client displays, in the style adjustment region according to a selected shape in one candidate bullet screen style, the characters included in the bullet screen content.

Exemplarily, the user may first select a desired shape from shapes in the candidate bullet screen styles displayed in the style editing interface. For example, the user selects a triangle as the shape of a bullet screen, and bullet screen content inputted by the user in the character input interface may be then directly filled in the triangle, so that the bullet screen content is displayed in a triangular shape. After selecting a specific shape, if the user is not satisfied with the selected shape, the user may further adjust the selected shape and fill the bullet screen content in the adjusted shape.

The size of the style adjustment region provided in the above embodiments of the present disclosure may be adjusted. Therefore, before the style adjustment region is displayed, a size setting operation on the style adjustment region may be received first. A size set through the size setting operation is determined as a size applied when the style adjustment region is displayed in the style editing interface.

Using a grid region as an example of the style adjustment region, before the grid region is displayed, various candidate sizes may be first provided for the user to select. The user may select a corresponding candidate size according to the quantity of the characters included in the to-be-transmitted bullet screen content. Alternatively, the user may directly input a size of the grid region (for example, the size of the grid region may be 10×10 or 15×15, the user may perform division at different granularity according to the quantity of characters included in bullet screen content actually inputted each time). When the user does not set the size of the grid region, the client may display the grid region in the style editing interface according to a default size. The default size may be set according to an actual application scenario. Alternatively, the client may automatically select the smallest size that can accommodate the bullet screen content according to the quantity of the characters included in the to-be-transmitted bullet screen content.

In some embodiments, the attributes of the bullet screen style further include at least one of the following: a color of the bullet screen content, a size of the bullet screen content, a special effect of the bullet screen content, or an arrangement manner of the bullet screen content. The receiving, by using the style editing interface, a bullet screen style set for the bullet screen content may be implemented in such a manner: The client determines a new bullet screen style in response to a setting operation on at least one of the color, the size, the special effect, or the arrangement manner of the bullet screen content in the style adjustment region, and displays, in the style editing interface, the bullet screen content applying the new bullet screen style. The client determines, when the setting operation is no longer received in a predetermined time or a bullet screen transmission operation is received, the new bullet screen style as the bullet screen style set for the bullet screen content.

In the above embodiments of the present disclosure, the attributes of the bullet screen style further include at least one of the following in addition to the shape: a color of the bullet screen content, a size of the bullet screen content, a special effect of the bullet screen content, or an arrangement manner (for example, horizontal arrangement, vertical arrangement, or inclined arrangement) of the bullet screen content.

The client determines the new bullet screen style in response to the setting operation on at least one of the color, the size, the special effect, or the arrangement manner of the bullet screen content in the style adjustment region. For example, the bullet screen style includes a color A1, a size B1, a special effect C1, and an arrangement manner D1. If the user changes the color A1 to A2 and the size B1 to B2, the new bullet screen style including the color A2, the size B2, the special effect C1, and the arrangement manner D1 may be obtained.

For example, the user may uniformly set the color of the bullet screen content to red, green, or a gradient color in the style adjustment region, or set only some characters included in the bullet screen content to red, and keep other characters in a default color. The user may set the size of the bullet screen content. For example, sizes of the characters included in the bullet screen content may be uniformly set to 10; or only some characters included in the bullet screen content are set to 10, and other characters remain in the default size.

For example, the characters included in the bullet screen content are uniformly arranged in an oblique manner, or only some characters included in the bullet screen content are arranged in an oblique manner, and other characters are arranged in a horizontal manner.

The user may also add a corresponding special effect to the bullet screen content, for example, add some flames, color stripes, or the like to all or some characters.

The client may display, in the style editing interface (such as the style preview region) in real time, the bullet screen content applying the new bullet screen style. The client determines, when the setting operation is no longer received in a predetermined time or a bullet screen transmission operation is received, the new bullet screen style as the bullet screen style set for the bullet screen content.

In addition to setting the attributes of the bullet screen style, the style adjustment region may further support setting the types of the bullet screen style. For example, two options of "static bullet screen" and "dynamic bullet screen" are provided for the user to select.

In some embodiments, before the transmitting the bullet screen content and the bullet screen style, the method further includes: determining, by the client, an actual region occupied by the characters included in the bullet screen content in the style adjustment region; and transforming coordinates of the characters in the bullet screen content according to the actual region when a size of the actual region is less than a default size of the style adjustment region, to update a shape in the bullet screen style set for the bullet screen content.

Before transmitting the bullet screen content and the bullet screen style to the server, the client may further transform the shape in the bullet screen style, and transmit a transformed shape and the bullet screen content to the server.

Using a grid region as an example of the style adjustment region, when the size of the actual region occupied by the bullet screen content in the grid region is less than a size of the grid region, the actual region is used as a new grid region, and coordinates of the characters in the bullet screen content in the new grid region are determined and used as transformed coordinates.

Figure 6:
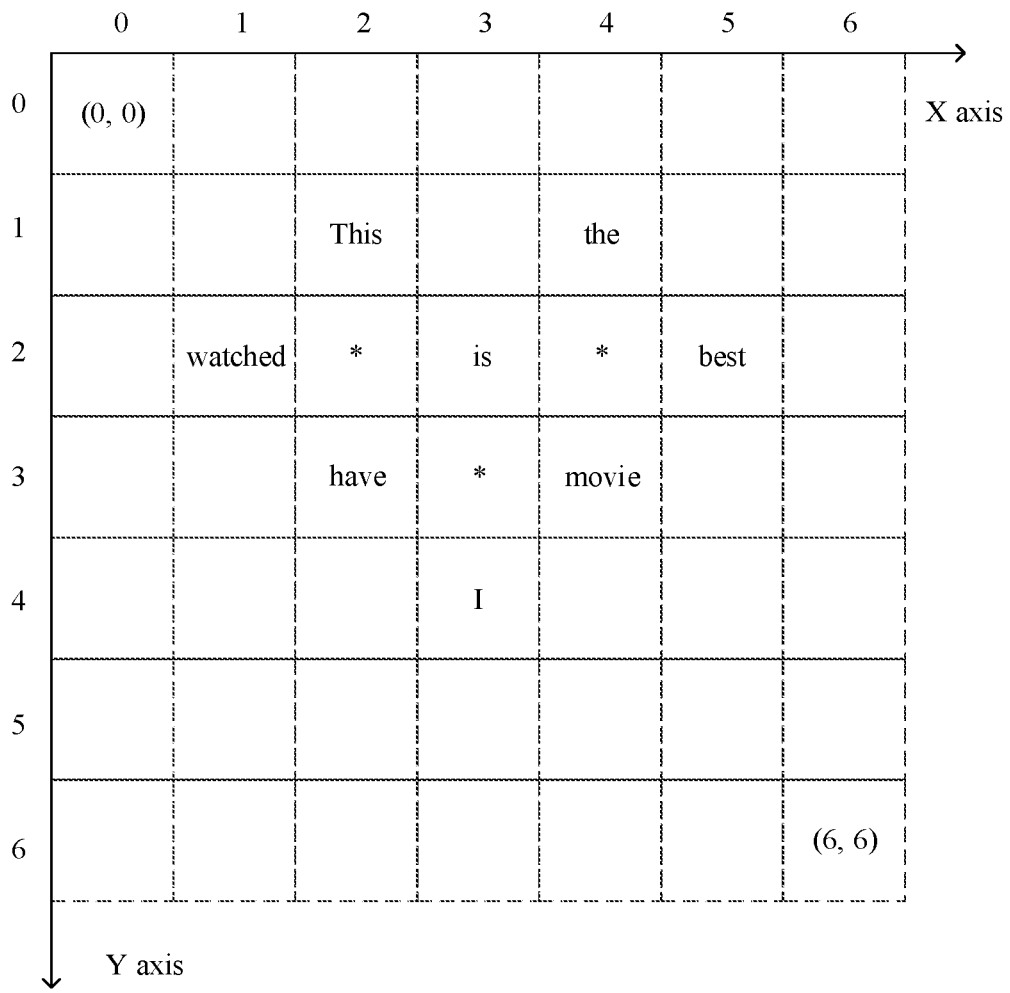
FIG. 6 is a schematic diagram of a coordinate system according to an embodiment of the present disclosure.
Figure 9:
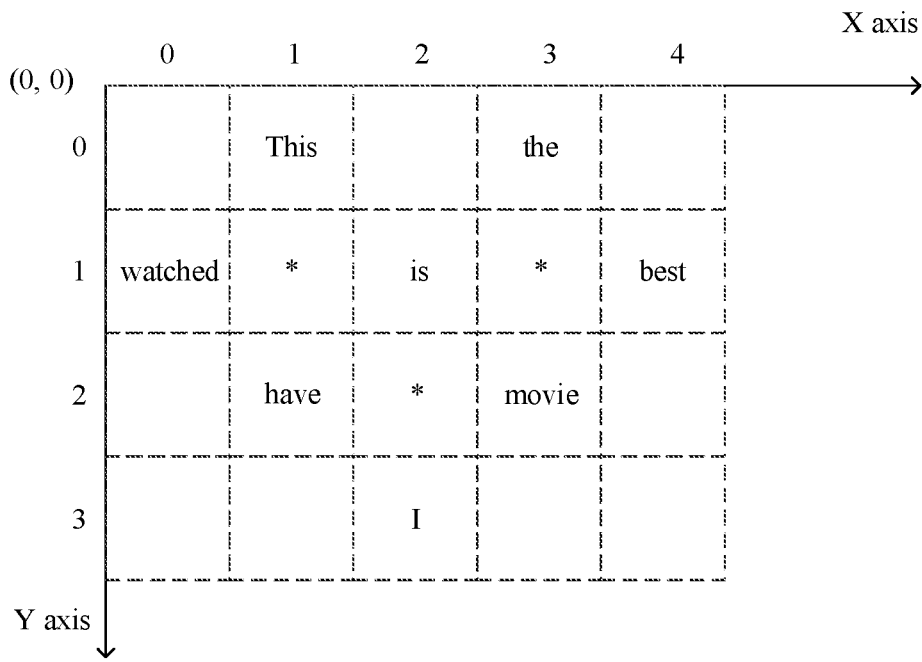
FIG. 9 is a schematic diagram of a coordinate system according to an embodiment of the present disclosure.

For example, referring to FIG. 6, a size of a grid region in the bullet screen editing interface is 7×7, and a size of an actual region occupied by the bullet screen content (that is, a heart-shaped bullet screen in FIG. 6) is 5×4 (which is described by using a matrix region as an example). The client first transforms coordinates of the heart-shaped bullet screen in the 7×7 grid region into coordinates in the 5×4 grid region (as shown in FIG. 9), and transmits the coordinates of the characters in the bullet screen content in the 5×4 grid region to the server.

As shown in FIG. 3C, this embodiment of the present disclosure provides a function for inputting the bullet screen content by using the character input interface, and a function for setting the bullet screen style by using the operation entry and the style editing interface, thereby improving the usability of bullet screen editing, and improving the efficiency of obtaining the bullet screen content and the bullet screen style.

An exemplary structure of the bullet screen processing apparatus 455 that is provided in the embodiments of the present disclosure and implemented as software modules is described below. In some embodiments, as shown in FIG. 2, the software modules in the bullet screen processing apparatus 455 stored in the memory 450 may include: a display module 4551, a receiving module 4552, and a transmission module 4553. In some embodiments, the apparatus may further include a determining module 4554 and a transformation module 4555.

The display module 4551 is configured to display a bullet screen editing interface in response to a bullet screen editing operation received during playback of multimedia information. The receiving module 4552 is configured to receive to-be-transmitted bullet screen content by using the bullet screen editing interface, and receive, by using the bullet screen editing interface, a bullet screen style set for the bullet screen content, attributes of the bullet screen style including a shape of the bullet screen content. The transmission module 4553 is configured to transmit the bullet screen content and the bullet screen style. The display module 4551 is configured to display, in a multimedia playback interface, the bullet screen content conforming to the bullet screen style.

In some embodiments, the bullet screen editing interface includes a character input interface used for editing the to-be-transmitted bullet screen content and an operation entry used for setting the bullet screen style. The receiving module 4552 is configured to receive the to-be-transmitted bullet screen content by using the character input interface. The receiving module 4552 is configured to display a style editing interface in response to a trigger operation for the operation entry, and receive, by using the style editing interface, the bullet screen style set for the bullet screen content.

In some embodiments, the display module 4551 is configured to display a style adjustment region in the style editing interface, and display, in the style adjustment region, characters included in the bullet screen content; and determine, in response to a shift operation on at least some characters in the bullet screen content, a new bullet screen style including a new shape, and display, in the style editing interface, the bullet screen content applying the new bullet screen style. The apparatus further includes the determining module 4554, and the determining module is configured to determine, when the shift operation is no longer received in a predetermined time or a bullet screen transmission operation is received, the new bullet screen style as the bullet screen style set for the bullet screen content.

In some embodiments, the style editing interface further includes a style preview region. The display module 4551 is configured to display, in the style preview region, the bullet screen content applying the new bullet screen style.

In some embodiments, the style adjustment region is a grid region, and the grid region includes a plurality of grids used for filling in the characters in the bullet screen content; or the style adjustment region is a pixel region.

In some embodiments, the determining module 4554 is configured to determine, in response to a size setting operation on the style adjustment region, a size set through the size setting operation as a size applied when the style adjustment region is displayed in the style editing interface.

In some embodiments, the determining module 4554 is configured to determine an actual region occupied by the characters included in the bullet screen content in the style adjustment region. The apparatus further includes the transformation module 4555. The transformation module 4555 is configured to transform coordinates of the characters in the bullet screen content according to the actual region when a size of the actual region is less than a size of the style adjustment region, to update a shape in the bullet screen style set for the bullet screen content.

In some embodiments, the display module 4551 is configured to perform any one of the following operations: displaying, in the style adjustment region, the characters included in the bullet screen content according to a shape in a default bullet screen style; or displaying, in the style editing interface, candidate bullet screen styles corresponding to the bullet screen content, and displaying, in the style adjustment region in response to a selection operation on the candidate bullet screen styles corresponding to the bullet screen content, the characters included in the bullet screen content according to a shape in a selected candidate bullet screen style.

In some embodiments, the attributes of the bullet screen style further include at least one of the following: a color of the bullet screen content, a size of the bullet screen content, a special effect of the bullet screen content, or an arrangement manner of the bullet screen content. The style editing interface includes a style adjustment region. The display module 4551 is configured to determine a new bullet screen style in response to a setting operation on at least one of the color, the size, the special effect, or the arrangement manner of the bullet screen content in the style adjustment region, and display, in the style editing interface, the bullet screen content applying the new bullet screen style. The determining module 4554 is configured to determine, when the setting operation is no longer received in a predetermined time or a bullet screen transmission operation is received, the new bullet screen style as the bullet screen style set for the bullet screen content.

In some embodiments, the style editing interface further includes a style preview region. The display module 4551 is configured to display, in the style preview region, the bullet screen content applying the new bullet screen style.

In some embodiments, types of the bullet screen style include a static bullet screen and a dynamic bullet screen. The display module 4551 is configured to determine a new bullet screen style including a set bullet screen type in response to a setting operation for a bullet screen type of the bullet screen content, and display, in the bullet screen editing interface, the bullet screen content applying the new bullet screen style. The determining module 4554 is configured to determine, when the setting operation is no longer received in a predetermined time or a bullet screen transmission operation is received, the new bullet screen style as the bullet screen style set for the bullet screen content.

In some embodiments, the display module 4551 is configured to display, in the bullet screen editing interface when the bullet screen type in the new bullet screen style is a static bullet screen, the bullet screen content applying an attribute of the new bullet screen style, and keep the applied attribute unchanged; and display, in the bullet screen editing interface when the bullet screen type in the new bullet screen style is a dynamic bullet screen, the bullet screen content applying an attribute of the new bullet screen style, and change the applied attribute.

In some embodiments, the display module 4551 is configured to start to display the bullet screen content conforming to the bullet screen style from a first end of the multimedia playback interface, and gradually move the bullet screen content to a second end of the multimedia playback interface, until the bullet screen content is moved out of the multimedia playback interface.

In some embodiments, the transmission module 4553 is configured to perform at least one of the following operations: transmitting the bullet screen content and the bullet screen style to a client that is playing the multimedia information and is in an online state; transmitting the bullet screen content and the bullet screen style to a client that is playing the multimedia information and is associated with a user account having a potential friendship with a bullet screen editing account; transmitting the bullet screen content and the bullet screen style to a client associated with an active user account; or transmitting the bullet screen content and the bullet screen style to a client that is playing the multimedia information and is associated with a user account selected by the bullet screen editing account, the bullet screen editing account being a user account editing the bullet screen style.

In some embodiments, the transmission module 4553 is configured to transmit the bullet screen content and the default bullet screen style when the to-be-transmitted bullet screen content is received by using the bullet screen editing interface and the bullet screen style set for the bullet screen content is not received. The display module 4551 is configured to display, in a multimedia playback interface, the bullet screen content conforming to the bullet screen style.

In some embodiments, the determining module 4554 is configured to display, in the bullet screen editing interface, the candidate bullet screen styles corresponding to the bullet screen content, and determine, in response to the selection operation on the candidate bullet screen styles corresponding to the bullet screen content, the selected candidate bullet screen style as the bullet screen style set for the bullet screen content; or display, in the bullet screen editing interface, the candidate bullet screen styles corresponding to the bullet screen content, determine similarities between feature vectors of the candidate bullet screen styles and a feature vector of the bullet screen editing account in response to a setting operation of automatically setting a bullet screen style for the bullet screen content, and determine the candidate bullet screen style with the highest similarity as the bullet screen style set for the bullet screen content. The bullet screen editing account is a user account editing the bullet screen style.

In some embodiments, the determining module 4554 is configured to perform at least one of the following operations: obtaining a bullet screen style used by a user account having a potential friendship with the bullet screen editing account as a candidate bullet screen style; obtaining a bullet screen style used by a user account having a social relationship with the bullet screen editing account as a candidate bullet screen style; or obtaining a bullet screen style with a usage frequency greater than a frequency threshold or a score greater than a score threshold as a candidate bullet screen style.

Descriptions of the apparatus embodiments of the present disclosure are similar to the descriptions of the method embodiments. The apparatus embodiments have beneficial effects similar to those of the method embodiments and thus are not repeatedly described. Technical details that are not exhausted in the bullet screen processing apparatus provided in the embodiments of the present disclosure may be understood according to the descriptions of any one of FIG. 3A, FIG. 3B, FIG. 3C, and FIG. 8.

The following describes an exemplary implementation of the methods and embodiments of the present disclosure in an actual application scenario.

Using a video playback client as an example. when a user wants to transmit a bullet screen while watching a video, the user clicks/taps a bullet screen edition button, and an input method pops up for inputting bullet screen content. FIG. 4 is a schematic diagram of an example bullet screen editing interface according to an embodiment of the present disclosure. As shown in FIG. 4, a user inputs bullet screen content in a text box (that is, the character input interface 43), such as "This is the best movie I have watched". After a "Send" button on the right side of the text box is clicked/tapped, the bullet screen content is transmitted to a screen for display. A "Style" button (that is, the operation entry 44) on the right side of the "Send" button is a newly added function entry button for setting a bullet screen style for the bullet screen content in this embodiment of the present disclosure. When the user inputs the bullet screen content that the user desires to transmit in the text box, and directly clicks/taps the "Send" button, the bullet screen content is displayed on the screen in the form of a line of text (that is, a default bullet screen style). When the user clicks/taps the "Style" button, a style editing interface is displayed, for example, a style editing interface is jumped to.

FIG. 5A is a schematic diagram of a style editing interface according to an embodiment of the present disclosure. As shown in FIG. 5A, the style editing interface mainly includes two regions: a style adjustment region 51 on the left and a style preview region 52 on the right. The style preview region 52 on the right is responsible for real-time display of adjusted bullet screen content in the style adjustment region 51 on the left. After confirming the effect in the style preview region 52, the user clicks/taps the "Send" button in the style preview region 52, and the bullet screen content and the bullet screen style enter a subsequent sending process.

Relative positions of the style adjustment region and the style preview region are not limited to the relative positions shown in FIG. 5A, which may be that the style adjustment region is located on the right side, and the style preview region is located on the left side, or the style adjustment region is located on the upper side, and the style preview region is located on the lower side.

As shown in FIG. 5A, the style adjustment region on the left is a grid region in which character positions may be adjusted, and each grid has coordinates for confirming the position. The grid region in FIG. 5A is a size of 7×7. The size of the grid region is not limited to the size of 7×7 shown in FIG. 5A, and may be a size of 10×10 or another size. This is not limited in any embodiment of the present disclosure.

Figure 7:
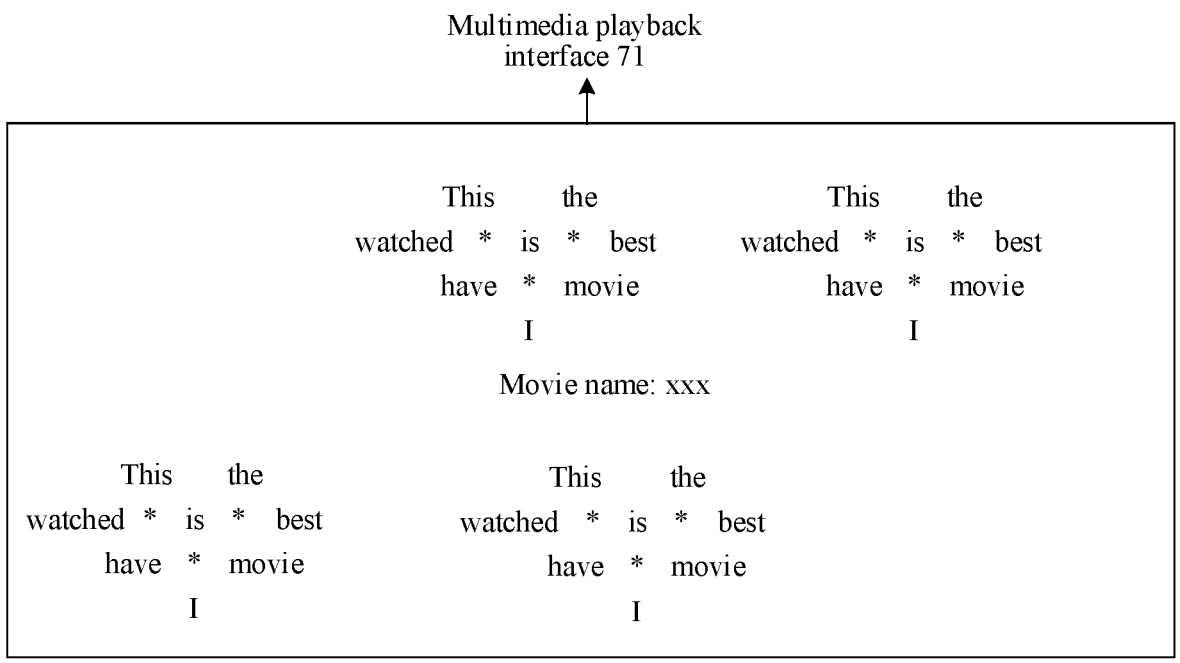
FIG. 7 is a schematic diagram of an interface of displaying a heart-shaped bullet screen according to an embodiment of the present disclosure.

Descriptions are made below by using the size of 7×7 shown in FIG. 5A as an example. The user may input characters in the grid region, and each grid may be inputted with only one character. When the user continuously inputs a plurality of characters, other characters are filled in the following grids in sequence. Subsequently, a coordinate system is established based on the grid region to determine coordinates corresponding to each grid. FIG. 6 is a schematic diagram of a coordinate system according to an embodiment of the present disclosure. As shown in FIG. 6, if a grid in the upper left corner of the grid region is used as a coordinate origin (0, 0), coordinates of a grid in the lower right corner are (6, 6). In this way, a coordinate position of each grid can be determined according to the coordinate system. In this embodiment of the present disclosure, the position of the coordinate origin is not limited as long as the coordinate position of each grid is determined. For example, the coordinate system may be established with a grid in the lower left corner of the grid region as the coordinate origin, or may be established with the grid in the lower right corner of the grid region as the coordinate origin, or may be established with the grid in the upper right corner of the grid region as the coordinate origin. After the coordinate system is established, each character added by the user in the grid has a unique corresponding coordinate position. As shown in FIG. 6, the bullet screen content "This is the best movie I have watched" (the bullet screen content also includes asterisk characters, and for ease of understanding, corresponding descriptions are omitted) is arranged in grids in a heart shape, and each character has a corresponding coordinate position. After the user adds the characters and completes the arrangement, and clicks the "Send" button in FIG. 5A, the bullet screen content appears in a multimedia playback interface in the heart shape in the grid region. In an example, referring to FIG. 7, a movie being played and a plurality of pieces of heart-shaped bullet screen content are shown in a multimedia playback interface 71 in FIG. 7.

This embodiment of the present disclosure is not limited to the above-mentioned methods for positioning the characters by using grids. In fact, the user may alternatively drag the characters in the style adjustment region directly, and record pixel coordinates of the characters to record character coordinate positions. That is, the style adjustment region may be a pixel region.

Figure 8:
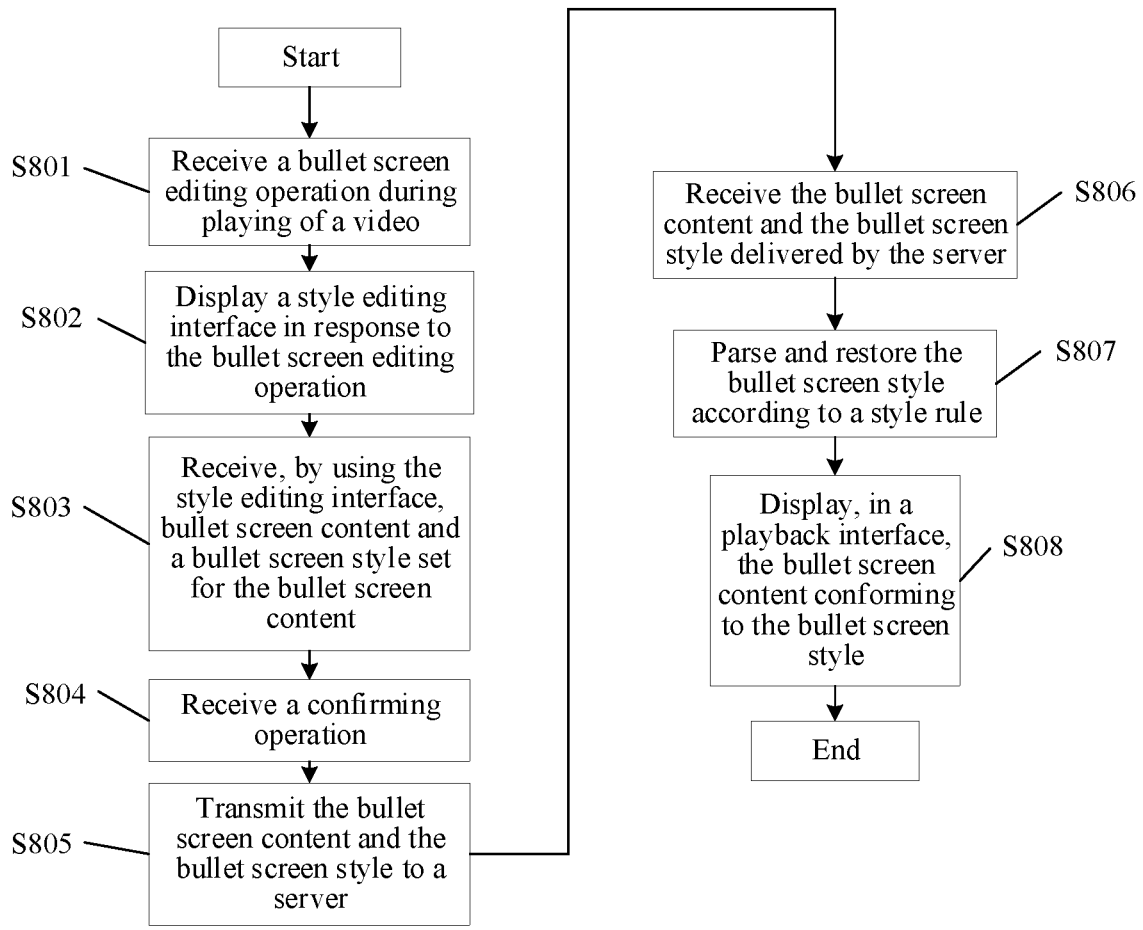
FIG. 8 is a schematic flowchart of a bullet screen processing method according to an embodiment of the present disclosure.

FIG. 8 is a schematic flowchart of a bullet screen processing method according to an embodiment of the present disclosure, which will be described below with reference to operations shown in FIG. 8.

Operation S801: A client receives a bullet screen editing operation during playing of a video.

Operation S802: The client displays a style editing interface in response to the bullet screen editing operation.

In some embodiments, the style editing interface may be displayed when a specific hot key operation (such as a click operation or a long-press operation) set on a playback interface of the video is received.

Exemplarily, as shown in FIG. 4, when a user wants to transmit a bullet screen while watching the video, the user may click/tap the "Style" button set on the playback interface, so that the client displays the style editing interface. The style editing interface may be displayed floating on the played video, or displayed independently of the playback interface of the video.

Operation S803: The client receives, by using the style editing interface, bullet screen content and a bullet screen style set for the bullet screen content.

The style editing interface includes a style adjustment region and a style preview region. The to-be-transmitted bullet screen content is received by using the style adjustment region, and the bullet screen style set for the bullet screen content. The style preview region is used for displaying in real time the bullet screen content applying the set bullet screen style.

Operation S804: The client receives a confirming operation.

As shown in FIG. 5A or FIG. 5B, the user previews the edited bullet screen style in the style preview region. After confirming the effect (that is, the edited bullet screen style meets requirements of the user), the user clicks/taps the "Send" button to enter a subsequent sending process.

Operation S805: The client transmits the bullet screen content and the bullet screen style to a server.

When transmitting a bullet screen to the server, the client not only transmits bullet screen content, but also transmits a bullet screen style set for the bullet screen content. The bullet screen style may be a set of coordinate data including coordinate positions corresponding to characters included in the bullet screen content. Using a heart-shaped bullet screen in FIG. 6 as an example, coordinates corresponding to characters included in the bullet screen content are as follows: this (2, 1), is (3, 2), the (4, 1), best (5, 2), movie (4, 3), I (3, 4), have (2, 3), watched (1, 2), and coordinates of three asterisks are (2, 2), (4, 2) and (3, 3). This set of coordinates are calculated in a grid coordinate system of 7×7. However, in fact, the heart-shaped bullet screen only occupies an area of a size of 5×4. Therefore, the set of coordinates are transformed once into coordinates in a coordinate system shown in FIG. 9. After transformation, the coordinates corresponding to the characters are as follows: this (1, 0), is (2, 1), the (3, 0), best (4, 1), movie (3, 2), I (2, 3), have (1, 2), watched (0, 1), and coordinates of three asterisks are (1, 1), (3, 1) and (2, 2). The transformed coordinate data is transmitted to the server as a piece of bullet screen style data for storage.

Operation S806: The client receives the bullet screen content and the bullet screen style delivered by the server.

When the client requests bullet screen data, the client also obtains complete coordinate data of each bullet screen from the server. The client may be all clients that watch the video and enable the bullet screen function, or may be only a client associated with a user account having a social relationship with a bullet screen editing account. Still using the heart-shaped bullet screen as an example, a piece of bullet screen downloaded by the client from the server is: this (1, 0), is (2, 1), the (3, 0), best (4, 1), movie (3, 2), I (2, 3), have (1, 2), watched (0, 1), and coordinates of three asterisks are (1, 1), (3, 1) and (2, 2).

Operation S807: The client parses and restores the bullet screen style according to a style rule.

Operation S808: The client displays, in a multimedia playback interface, the bullet screen content conforming to the bullet screen style.

After receiving the bullet screen data transmitted by the server, the client first determines the area that the bullet screen needs to occupy on the screen according to the coordinate positions. Using the heart-shaped bullet screen as an example, the client first determines that the area that the bullet screen needs to occupy on the screen is a grid region of 5×4 according to the coordinate positions. Next, the characters are filled in corresponding positions in the grid region of 5×4 to obtain the shape of the bullet screen, and the bullet screen content is drawn on the screen according to the shape, thereby forming the final bullet screen content in a custom style on the screen.

The bullet screen processing method provided in the above embodiments of the present disclosure may be implemented in three layers according to a model-view-controller (MVC) architecture, including: a display layer, a control layer, and a data layer.

FIG. 5A is a schematic interface diagram of the display layer, including: a style adjustment region on the left and a style preview region on the right. The two regions are respectively described in detail below.

The style adjustment region is a grid region in which character positions are adjustable. Each grid is implemented by using a text input component (EditText), and can be filled with only one character. By monitoring a click/tap event, when a user clicks/taps a specific grid, the corresponding text input component responds, and a character inputted by the user through an input method is displayed in each grid. The entire grid region is tiled by 7×7 independent grids, and the grids record respective coordinate positions.

A final style of a bullet screen is drawn in the style preview region on the right according to a correspondence between the coordinate positions of the grids in the style adjustment region on the left and the characters in the grids. The preview window may be implemented by using a custom text control (TextView), and the drawing and display of the characters at different coordinate positions are completed in the custom text control.

Figure 10:
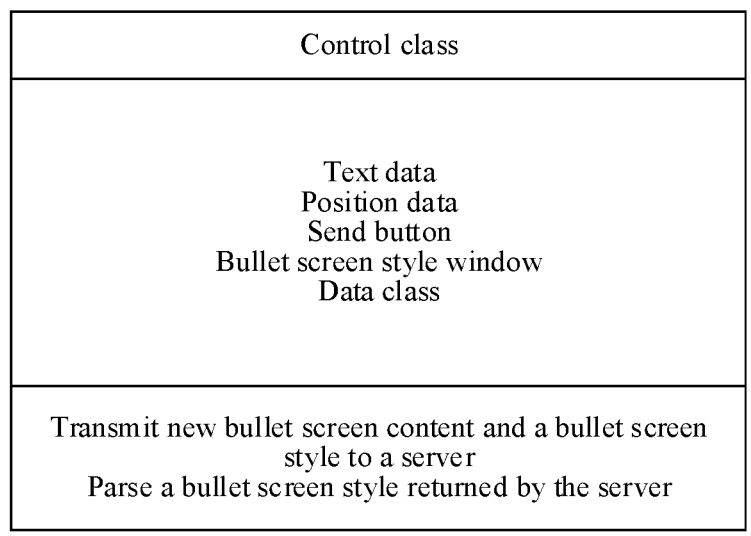
FIG. 10 is a schematic flowchart of a control class according to an embodiment of the present disclosure.

FIG. 10 is a schematic diagram of a control class, which includes a data class (DamakuData) and a bullet screen style window (DanmaStyleView). The control class is used as a bridge between the data class and the display class, to combine functions of the two classes and encapsulate the functions into a class for an outer call. In this way, logic and interface can be well separated, and one function can be implemented with only one implementation. The functions that can be implemented by the control class include: organizing bullet screen data, creating a bullet screen style, transmitting new bullet screen content and the bullet screen style to a server, parsing the bullet screen style returned by the server, and the like.

Figure 11:
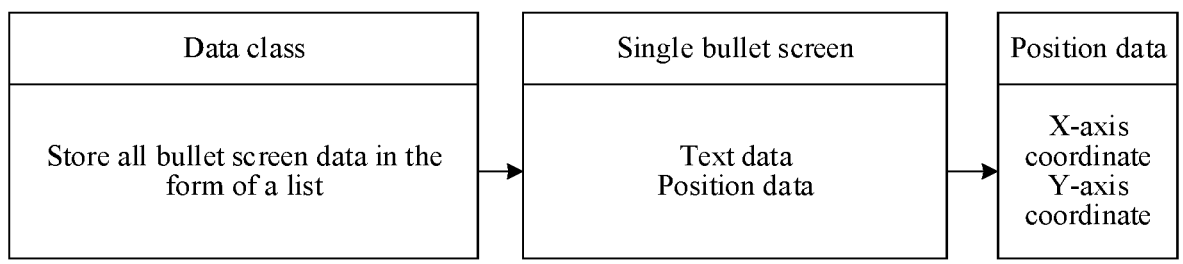
FIG. 11 is a schematic flowchart of a data class according to an embodiment of the present disclosure.

The data layer is mainly used for processing the transmission and parsing of the bullet screen data between a client and the server. FIG. 11 is a schematic diagram of the data class. The data class (DamakuData) is responsible for storing all bullet screen data in the form of a list (Danmaku-List). A single bullet screen (DanmukuItem) includes text data (mText) and position data (mPosition). The position data includes an X-axis coordinate and a Y-axis coordinate corresponding to a character. Bullet screen content with a bullet screen style created in the bullet screen style adjustment region corresponds to a single bullet screen. The control layer also displays the style of the bullet screen content by parsing the data class.

Through the bullet screen processing method provided in the embodiments of the present disclosure, the display forms of bullet screens are increased, in addition to displaying bullet screen content in the form of a line of text on the screen, a user may further customize the style of the bullet screen content. In addition, the bullet screen style is saved in a server together with the bullet screen content, thereby implementing the persistent storage of the bullet screen style. The bullet screen processing method provided in the embodiments of the present disclosure enriches the display forms of bullet screens, increases a user's enjoyment of the bullet screen function, and consequently increases the willingness of users to use the bullet screen function. In addition, it is easier for the displayed bullet screen content to draw attention of users, thereby improving the actual utilization of computing resources consumed by display of the bullet screen content.

An embodiment of the present disclosure provides a storage medium storing executable instructions, the executable instructions, when executed by a processor, cause the processor to perform the bullet screen processing method provided in the embodiments of the present disclosure, for example, the bullet screen processing method shown in FIG. 3A, FIG. 3B, FIG. 3C, or FIG. 8.

In some embodiments, the computer-readable storage medium may be a memory such as a ferromagnetic random access memory (FRAM), a read only memory (ROM), a programmable read-only memory (PROM), an erasable programmable read-only memory (EPROM), an electrically erasable programmable read-only memory (EEPROM), a flash memory, a magnetic memory, a compact disc, or a compact disc read-only memory (CD-ROM), or may be various devices including one of or any combination of the above-mentioned memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

In conclusion, the embodiments of the present disclosure have the following beneficial effects:

When a user needs to transmit a bullet screen, the user is allowed to customize a bullet screen style for bullet screen content. The user may arrange the bullet screen content that the user wants to transmit in different shapes, or add a color or a special effect, or set a bullet screen type. The bullet screen content is displayed in the bullet screen style customized by the user, thereby enriching the display forms of the bullet screen content, increasing users' enjoyment of the bullet screen function, and thus increasing the willingness of the user to use the bullet screen function.

The above-mentioned descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. A bullet screen processing method, performed by an electronic device, the method comprising:
    displaying a bullet screen editing interface in response to a bullet screen editing operation received during playback of multimedia information;
    receiving bullet screen content by using the bullet screen editing interface, and receiving, by using the bullet screen editing interface, a bullet screen style set for the bullet screen content, attributes of the bullet screen style set comprising a shape of the bullet screen content and coordinate data corresponding to the bullet screen content on the bullet screen editing interface;
    determining a size of an actual region occupied by characters comprised in the bullet screen content on a multimedia playback interface of the electronic device;
    determining new coordinates corresponding to the bullet screen content in the actual region based on a difference between the size of the actual region and a size of a style adjustment region on the bullet screen editing interface;
    updating a shape in the bullet screen style set for the bullet screen content based on the new coordinates corresponding to the bullet screen content; and
    transmitting the bullet screen content and the bullet screen style set to display, on the multimedia playback interface, the bullet screen content conforming to the bullet screen style set.

2. The method according to claim 1, wherein the bullet screen editing interface comprises a character input interface used for editing the bullet screen content and an operation entry used for setting the bullet screen style set;
    the receiving the bullet screen content by using the bullet screen editing interface comprises:
    receiving the bullet screen content by using the character input interface; and
    the receiving, by using the bullet screen editing interface, the bullet screen style set for the bullet screen content comprises:
    displaying a style editing interface in response to a trigger operation for the operation entry, and receiving, by using the style editing interface, the bullet screen style set for the bullet screen content.

3. The method according to claim 2, wherein the displaying the style editing interface, and receiving, by using the style editing interface, the bullet screen style set for the bullet screen content comprises:
    displaying a style adjustment region in the style editing interface, and displaying, in the style adjustment region, the characters comprised in the bullet screen content;
    determining, in response to a shift operation on at least some characters in the bullet screen content, a new bullet screen style set comprising a new shape, and displaying, in the style editing interface, the bullet screen content applying the new bullet screen style set; and
    determining, based on the shift operation being no longer received in a predetermined time or a bullet screen transmission operation being received, the new bullet screen style set as the bullet screen style set for the bullet screen content.

4. The method according to claim 3, wherein the style editing interface further comprises a style preview region; and the displaying, in the style editing interface, the bullet screen content applying the new bullet screen style set comprises:

displaying, in the style preview region, the bullet screen content applying the new bullet screen style set.

5. The method according to claim 3, wherein the style adjustment region is a grid region, and the grid region comprises a plurality of grids used for filling in the characters in the bullet screen content; or the style adjustment region is a pixel region.

6. The method according to claim 3, wherein prior to the displaying the style adjustment region in the style editing interface, the method further comprises:

determining, in response to a size setting operation on the style adjustment region, a size set through the size setting operation as a size applied based on the style adjustment region being displayed in the style editing interface.

7. The method according to claim 3, wherein the displaying, in the style adjustment region, the characters comprised in the bullet screen content comprises:

performing any one of the following operations:

displaying, in the style adjustment region, the characters comprised in the bullet screen content according to a shape in a default bullet screen style set; or displaying, in the style editing interface, candidate bullet screen style sets corresponding to the bullet screen content, and displaying, in the style adjustment region in response to a selection operation on the candidate bullet screen style sets corresponding to the bullet screen content, the characters comprised in the bullet screen content according to a shape in a selected candidate bullet screen style set.

8. The method according to claim 2, wherein the attributes of the bullet screen style set further comprise at least one of the following: a color of the bullet screen content, a size of the bullet screen content, a special effect of the bullet screen content, or an arrangement manner of the bullet screen content;

the style editing interface comprises a style adjustment region; and the receiving, by using the style editing interface, the bullet screen style set for the bullet screen content comprises:

determining a new bullet screen style set in response to a setting operation on at least one of the color, the size, the special effect, or the arrangement manner of the bullet screen content in the style adjustment region, and displaying, in the style editing interface, the bullet screen content applying the new bullet screen style set; and determining, based on the setting operation being no longer received in a predetermined time or a bullet screen transmission operation being received, the new bullet screen style set as the bullet screen style set for the bullet screen content.

9. The method according to claim 8, wherein the style editing interface further comprises a style preview region; and the displaying, in the style editing interface, the bullet screen content applying the new bullet screen style set comprises:

displaying, in the style preview region, the bullet screen content applying the new bullet screen style set.

10. The method according to claim 1, wherein types of the bullet screen style set comprise a static bullet screen and a dynamic bullet screen; and the receiving, by using the bullet screen editing interface, the bullet screen style set for the bullet screen content comprises:

determining a new bullet screen style set comprising a set bullet screen type in response to a setting operation for a bullet screen type of the bullet screen content, and displaying, in the bullet screen editing interface, the bullet screen content applying the new bullet screen style set; and determining, based on the setting operation being no longer received in a predetermined time or a bullet screen transmission operation being received, the new bullet screen style set as the bullet screen style set for the bullet screen content.

11. The method according to claim 10, wherein the displaying, in the bullet screen editing interface, the bullet screen content applying the new bullet screen style set comprises:

displaying, in the bullet screen editing interface based on the bullet screen type in the new bullet screen style set being the static bullet screen, the bullet screen content applying an attribute of the new bullet screen style set, and keeping the applied attribute unchanged; or displaying, in the bullet screen editing interface based on the bullet screen type in the new bullet screen style set being the dynamic bullet screen, the bullet screen content applying the attribute of the new bullet screen style set, and changing the applied attribute.

12. The method according to claim 1, wherein the displaying, in the multimedia playback interface, the bullet screen content conforming to the bullet screen style set comprises:

starting to display the bullet screen content conforming to the bullet screen style set from a first end of the multimedia playback interface, and gradually moving the bullet screen content to a second end of the multimedia playback interface, until the bullet screen content is moved out of the multimedia playback interface.

13. The method according to claim 1, wherein the transmitting the bullet screen content and the bullet screen style set comprises:

performing at least one of the following operations:

transmitting the bullet screen content and the bullet screen style set to a client that is playing the multimedia information and is in an online state;

transmitting the bullet screen content and the bullet screen style set to a client that is playing the multimedia information and is associated with a user account having a potential friendship with a bullet screen editing account;

transmitting the bullet screen content and the bullet screen style set to a client associated with an active user account; or transmitting the bullet screen content and the bullet screen style set to a client that is playing the multimedia information and is associated with a user account selected by the bullet screen editing account, the bullet screen editing account being a user account editing the bullet screen style set.

14. The method according to claim 1, further comprising: transmitting the bullet screen content and a default bullet screen style set based on the bullet screen content being received by using the bullet screen editing interface and the bullet screen style set for the bullet screen content is not received, to display, in the multimedia playback interface, the bullet screen content conforming to the default bullet screen style set.

15. The method according to claim 1, wherein the receiving, by using the bullet screen editing interface, the bullet screen style set for the bullet screen content comprises:
displaying, in the bullet screen editing interface, candidate bullet screen style sets corresponding to the bullet screen content, and determining, in response to a selection operation on the candidate bullet screen style sets corresponding to the bullet screen content, a selected candidate bullet screen style set as the bullet screen style set for the bullet screen content;
displaying, in the bullet screen editing interface, the candidate bullet screen style sets corresponding to the bullet screen content, determining similarities between feature vectors of the candidate bullet screen style sets and a feature vector of a bullet screen editing account in response to a setting operation of automatically setting a bullet screen style set for the bullet screen content, and
determining a candidate bullet screen style set with a highest similarity as the bullet screen style set for the bullet screen content,
the bullet screen editing account being a user account editing the bullet screen style set.

16. The method according to claim 15, further comprising:
performing at least one of the following operations:
obtaining a bullet screen style set used by a user account having a potential friendship with the bullet screen editing account as a candidate bullet screen style set of the candidate bullet screen style sets;
obtaining a bullet screen style set used by a user account having a social relationship with the bullet screen editing account as a candidate bullet screen style set of the candidate bullet screen style sets; or
obtaining a bullet screen style set with a usage frequency greater than a frequency threshold or a score greater than a score threshold as a candidate bullet screen style set of the candidate bullet screen style sets.

17. A bullet screen processing apparatus, comprising:
at least one memory configured to store program code; and
at least one processor configured to read the program code and operate as instructed by the program code, the program code comprising:
displaying code configured to cause the at least one processor to display a bullet screen editing interface in response to a bullet screen editing operation received during playback of multimedia information;
receiving code configured to cause the at least one processor to receive bullet screen content by using the bullet screen editing interface, and receive, by using the bullet screen editing interface, a bullet screen style set for the bullet screen content, attributes of the bullet screen style set comprising a shape of the bullet screen content and coordinate data corresponding to the bullet screen content on the bullet screen editing interface;
first determining code configured to cause the at least one processor to determine a size of an actual region occupied by characters comprised in the bullet screen content on a multimedia playback interface of an electronic device;
second determining code configured to cause the at least one processor to determine new coordinates corresponding to the bullet screen content in the actual region based on a difference between the size of the actual region and a size of a style adjustment region on the bullet screen editing interface;
updating code configured to cause the at least one processor to update a shape in the bullet screen style set for the bullet screen content based on the new coordinates corresponding to the bullet screen content; and
transmission code configured to cause the at least one processor to transmit the bullet screen content and the bullet screen style set, to display, on the multimedia playback interface, the bullet screen content conforming to the bullet screen style set.

18. The bullet screen processing apparatus of claim 17, wherein the bullet screen editing interface comprises a character input interface used for editing the bullet screen content and an operation entry used for setting the bullet screen style set;
wherein the receiving code is further configured to cause the at least one processor to:
receive the bullet screen content by using the character input interface; and
display a style set editing interface in response to a trigger operation for the operation entry, and receive, by using the style set editing interface, the bullet screen style set for the bullet screen content.

19. A non-transitory computer-readable storage medium, storing at least one instruction executable by a processor to:
display a bullet screen editing interface in response to a bullet screen editing operation received during playback of multimedia information;
receive bullet screen content by using the bullet screen editing interface, and receive, by using the bullet screen editing interface, a bullet screen style set for the bullet screen content, attributes of the bullet screen style set comprising a shape of the bullet screen content and coordinate data corresponding to the bullet screen content on the bullet screen editing interface;
determine a size of an actual region occupied by characters comprised in the bullet screen content on a multimedia playback interface of an electronic device;
determine new coordinates corresponding to the bullet screen content in the actual region based on a difference between the size of the actual region and a size of a style adjustment region on the bullet screen editing interface;
update a shape in the bullet screen style set for the bullet screen content based on the new coordinates corresponding to the bullet screen content; and
transmit the bullet screen content and the bullet screen style set to display, in a multimedia playback interface, the bullet screen content conforming to the bullet screen style set.

* * * * *